(12) United States Patent
Otake et al.

(10) Patent No.: US 7,085,036 B2
(45) Date of Patent: Aug. 1, 2006

(54) MASK, SUBSTRATE WITH LIGHT REFLECTION FILM, MANUFACTURING METHOD FOR LIGHT REFLECTION FILM, MANUFACTURING METHOD FOR ELECTRO-OPTICAL DEVICE, AND ELECTRO-OPTICAL DEVICE, AND ELECTRONIC APPARATUS

(75) Inventors: Toshihiro Otake, Suwa (JP); Mutsumi Matsuo, Suwa (JP); Tadashi Tsuyuki, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/224,708

(22) Filed: Sep. 12, 2005

(65) Prior Publication Data

US 2006/0007530 A1    Jan. 12, 2006

Related U.S. Application Data

(62) Division of application No. 10/175,344, filed on Jun. 19, 2002.

(30) Foreign Application Priority Data

Jun. 20, 2001    (JP)    ............................. 2001-186694
Apr. 10, 2002    (JP)    ............................. 2002-108526

(51) Int. Cl.
   *G02F 1/29*     (2006.01)
   *G02F 1/1335*   (2006.01)

(52) U.S. Cl. ..................... 359/318; 349/113; 349/114
(58) Field of Classification Search ................ 359/315, 359/317, 318, 619, 245, 253; 349/113, 114, 349/104, 105, 42, 67, 139; 430/5, 6
   See application file for complete search history.

(56) References Cited

U.S. PATENT DOCUMENTS

| 5,204,765 A | * | 4/1993 | Mitsui et al. ................ 349/113 |
| 5,408,345 A | | 4/1995 | Mitsui et al. ................ 349/42 |
| 5,418,635 A | * | 5/1995 | Mitsui et al. ................ 349/113 |
| 5,453,855 A | | 9/1995 | Nakamura et al. ............ 349/58 |

(Continued)

FOREIGN PATENT DOCUMENTS

EP    1 156 359    11/2001

(Continued)

OTHER PUBLICATIONS

Examination Report issued on Aug. 24, 2004 for the corresponding Japanese Publication No. 2002-108528.

*Primary Examiner*—Loha Ben
(74) *Attorney, Agent, or Firm*—Harness, Dickey & Pierce, P.L.C.

(57) ABSTRACT

A substrate is provided with a light reflection film in which the heights of a plurality of convex portions or the depths of concave portions formed on a base material are specified to be substantially the same. The two-dimensional shapes of the plurality of convex portions or concave portions are specified to be the two-dimensional shapes of independent circles and polygons, or of either of them. In addition, the plurality of convex portions or concave portions are arranged in the direction of the plane on a random basis. The substrate is formed using a mask in which light transmission portions or light non-transmission portions are formed in units of dots, the number thereof being smaller than the number of dot regions. The dots are arranged irregularly in each of the units, and a plurality of units are included.

5 Claims, 22 Drawing Sheets

U.S. PATENT DOCUMENTS

| | | |
|---|---|---|
| 5,724,111 A | 3/1998 | Mizobata et al. |
| 5,940,154 A | 8/1999 | Ukita et al. ............. 349/113 |
| 6,104,460 A | 8/2000 | Abe et al. |
| 6,313,895 B1 | 11/2001 | Tsuda et al. ............. 349/113 |
| 6,538,711 B1 * | 3/2003 | Funahata et al. ......... 349/113 |
| 6,665,030 B1 | 12/2003 | Hanazawa et al. |
| 6,747,718 B1 | 6/2004 | Kanou et al. ............. 349/113 |
| 6,784,957 B1 | 8/2004 | Kanou et al. |
| 6,943,856 B1 * | 9/2005 | Yamaguchi et al. ....... 349/67 |
| 6,950,159 B1 * | 9/2005 | Kubo et al. ............... 349/114 |
| 2002/0041350 A1 | 4/2002 | Yamazaki et al. ......... 349/113 |
| 2003/0103178 A1 | 6/2003 | Sakamoto et al. |
| 2003/0218698 A1 | 11/2003 | Otake et al. ............... 349/42 |

FOREIGN PATENT DOCUMENTS

| | | |
|---|---|---|
| JP | 05-323371 | 12/1993 |
| JP | 08-95071 | 4/1996 |
| JP | 11-237623 | 8/1999 |
| JP | 11-242217 | 9/1999 |
| JP | 11-337964 | 10/1999 |
| JP | 2000-075132 | 3/2000 |
| JP | 2000-180833 | 6/2000 |
| JP | 2000-284272 A | 10/2000 |
| JP | 2000-189542 | 11/2000 |
| JP | 2001-005015 | 1/2001 |
| JP | 2001-154371 | 6/2001 |
| JP | 2001-194662 A | 7/2001 |
| JP | 2001-201742 A | 7/2001 |
| JP | 2001-290169 | 10/2001 |
| JP | 2002-14211 | 1/2002 |
| JP | 2002-072184 | 3/2002 |
| JP | 2002-258278 | 9/2002 |
| JP | 2003-149662 A | 5/2003 |
| WO | WO 01/38932 | 5/2001 |

* cited by examiner (a)

(b)

(a)

(b)

- PRIOR ART -

- PRIOR ART -

US 7,085,036 B2

MASK, SUBSTRATE WITH LIGHT REFLECTION FILM, MANUFACTURING METHOD FOR LIGHT REFLECTION FILM, MANUFACTURING METHOD FOR ELECTRO-OPTICAL DEVICE, AND ELECTRO-OPTICAL DEVICE, AND ELECTRONIC APPARATUS

CROSS REFERENCE TO RELATED APPLICATIONS

This application is a divisional patent application of U.S. Ser. No. 10/175,344 filed Jun. 19, 2002, claiming priority to Japanese Patent Application Nos. 2002-108526 filed Apr. 10, 2002 and 2001-186694 filed Jun. 20, 2001 all of which are hereby incorporated by reference.

BACKGROUND OF THE INVENTION

1. Technical Field of the Invention

The present invention relates to a mask, a substrate with a light reflection film, a manufacturing method for a light reflection film, a manufacturing method for an electro-optical device, and an electro-optical device, and an electronic apparatus.

For further details, the present invention relates to a mask for producing a substrate with light reflection film which brings about few interference fringes, a substrate with light reflection film using the same, a manufacturing method for a light reflection film, and an electro-optical device provided with the substrate with light reflection film which brings about few interference fringes, and an electronic apparatus provided with the substrate with light reflection film which brings about few interference fringes.

2. Description of the Related Art

It is known that liquid crystal display devices have been widely used as display devices in various electronic apparatuses because thicknesses can be reduced, power consumption can be reduced, and the like. Such a liquid crystal display device generally has the configuration in which a liquid crystal is encapsulated between a pair of glass substrates, etc., and the peripheries of the substrates are bonded together with a seal member. The electronic apparatus, on which such a liquid crystal display device is mounted, adopts the configuration in which a protection plate is placed on the observation side of the liquid crystal display device, that is, on the side of the observer visually identifying the display, in order to protect the liquid crystal display device from external shock, etc. Such a protection plate is a plate-shaped member made of, usually, a material having light-transmitting property, for example, transparent plastic.

However, it is difficult to make the surface of such a protection plate facing the liquid crystal display device a perfectly smooth surface, and in many cases, fine concavities and convexities exist. When such a protection plate was placed in the liquid crystal display device, there was a problem in that the display quality was degraded remarkably due to the fine concavities and convexities on the surface.

Causes of this degradation of the display quality include that the interval between the substrate and the protection plate on the observation side in the liquid crystal display device varies depending on the concavities and convexities existing on the surface of the protection plate. That is, interference occurs when emitted light from the liquid crystal display device passes through the protection plate corresponding to the aforementioned variations in the intervals and, as a result, the interference fringes occur. Consequently, it is assumed that the degradation of the display quality is brought about by overlapping of the interference fringes and the display image.

In Japanese Unexamined Patent Application Publication No. 6-27481, a reflective liquid crystal display 400 is disclosed as shown in FIG. 26, and in Japanese Unexamined Patent Application Publication No. 11-281972, a reflection transmission combination (transflective) type 500 is disclosed as shown in FIG. 27. In order to reduce occurrence of interference fringes, each of these is provided with a plurality of concavity and convexity structures 404a and 404b (504a and 504b) having different heights, a macromolecular resin film 405 (505) is formed thereon and, furthermore, a continuous corrugated reflection electrode 409 (509) is formed thereon.

Manufacturing processes for liquid crystal display devices having such a reflection electrode are disclosed, and an example is disclosed in FIG. 28. As shown in FIG. 28(a), a resist film 602 is formed over a glass substrate 600 and, thereafter, as shown in FIG. 28(b), exposure is performed through a pattern 604 composed of a plurality of circles having different diameters. Development is performed as shown in FIG. 28(c) and, therefore, convex portions 606a and 606b including a plurality of corners having different heights are placed. Subsequently, as shown in FIG. 28(d), heating is performed to soften the corners of the convex portions and, therefore, rounded-corner convex portions 608a and 608b are formed. As shown in FIG. 28(e), a predetermined quantity of macromolecular resin 620 is put into the space 610 among such concavity and convexity structures in order to make a continuous layer having a corrugated surface and, furthermore, a continuous corrugated reflection electrode 624 is formed on the macromolecular resin film 620 by a lamination means, for example, sputtering.

However, regarding liquid crystal display devices, for example, the reflective liquid crystal display and the reflection transmission combination (transflective) type liquid crystal display device disclosed in Japanese Unexamined Patent Application Publication No. 6-27481, etc., although the masks, in which a plurality of circles having different diameters, etc., have been regularly or partially irregularly arranged, have been used in order to place a plurality of concavity and convexity structures having different heights by the use of ultraviolet exposure and development, it has been difficult to precisely adjust the heights so as to effectively prevent interference of light because of variations in coating thicknesses, etc. Furthermore, since the reflection electrode has been formed on the plurality of concavity and convexity structures having different heights, there have been problems in that breaks and short circuits have been likely to occur, and the like. Regarding the disclosed manufacturing method for the substrate with light reflection film, there have been problems relating to manufacture in that a large number of steps have been required and many items have been required to control.

Therefore, regarding the substrates with light reflection film described in Japanese Unexamined Patent Application Publication No. 6-27481, etc., it has been difficult to effectively prevent the occurrence of the interference fringes and, in addition, it has been difficult to stably and efficiently manufacture such a substrate with light reflection film.

Accordingly, the inventors of the present invention earnestly researched regarding the aforementioned problems, and as a result, found out that when a plurality of convex portions or concave portions are placed on the base material in the substrate with light reflection film and are arranged in the direction of the plane on a random basis without changing the heights of the plurality of convex portions or concave portions substantially, the substrate with light reflection film which brings about few interference fringes can be produced with ease.

That is, it is an object of the present invention to provide a mask for producing a substrate with light reflection film which brings about few interference fringes and which can be produced with ease, such a substrate with light reflection film, a manufacturing method for such a light reflection film, and an electro-optical device provided with such a substrate with light reflection film, and an electronic apparatus provided with such a substrate with light reflection film.

SUMMARY OF THE INVENTION

According to the present invention, a mask for forming a pattern on a substrate including a plurality of dot regions is provided, wherein the mask is provided with light transmission portions which can transmit incident light and light non-transmission portions which, substantially, do not transmit light. The pattern formed from the aforementioned light transmission portions or light non-transmission portions is formed in units of dots, the number thereof being smaller than the number of the dot regions, and has an irregular arrangement in a unit, and a plurality of units are included and, therefore, the aforementioned problems can be overcome.

That is, regarding liquid crystal display device, etc., using the substrate with light reflection film, by making dots a basic unit while the number of the dots is smaller than the number of the dot regions, for example, by arranging light transmission portions or light non-transmission portions in the direction of the plane on a random basis in units of 3 dots, 6 dots, or 12 dots of RGB dots corresponding to the pixel, the information content regarding the pattern formed from the light transmission portions or light non-transmission portions can be reduced. Consequently, when a desired pattern, for example, a pattern formed from the light transmission portions or the light non-transmission portions having the two-dimensional shapes of independent circles (hereafter, ellipses are included) and polygons, or of either of them, is formed, the design of the mask can be performed with remarkable ease in a short time by repetition of such a basic unit.

Since the light transmission portions or light non-transmission portions are arranged in the direction of the plane on a random basis, when the substrate with light reflection film is manufactured, excellent light scattering effect can be exhibited and occurrence of interference fringes can be prevented effectively.

The reason the two-dimensional shape of the light transmission portion or light non-transmission portion is controlled is that regarding the photosensitive resin constituting the substrate with light reflection film, there are a positive type, in which the portion radiated with light that passed through the light transmission portion is photolyzed so as to be solubilized with respect to a developer, and a negative type, in which the portion radiated with light that passed through the light transmission portion is exposed so as to be insolubilized with respect to the developer.

In the configuration of the mask according to the present invention, the diameters of the light transmission portions or the light non-transmission portions are preferably specified to be values within the range of 3 to 15 µm.

In the configuration of the mask according to the present invention, preferably, a plurality of light transmission portions having different diameters or a plurality of light non-transmission portions having different diameters are provided.

That is, for example, preferably, the diameters of the light transmission portions or light non-transmission portions are differentiated, and 2 to 10 sorts of light transmission portions or light non-transmission portions are placed.

A mask according to another aspect of the present invention is the mask for forming a pattern on a substrate including a plurality of dot regions, provided with light transmission portions which can transmit incident light, and light non-transmission portions which, substantially, do not transmit light, wherein a pattern formed from the light transmission portions or light non-transmission portions is formed in units of dots, the number thereof being smaller than the number of the dot regions, and has a symmetrical part in each of the units.

According to this configuration, the substrate with light reflection film which brings about few interference fringes can be effectively manufactured. That is, since when the substrate with light reflection film is manufactured, it is possible to scatter light moderately by the use of a predetermined symmetrical pattern, for example, a pattern which is in mirror plane symmetry with respect to a virtual line with a mask divided by the virtual line, occurrence of interference fringes can be effectively prevented. Since the symmetrical pattern is used and the pattern is used repeatedly, the information content regarding the pattern can be reduced and, therefore, manufacture of the substrate with light reflection film becomes easy.

Another aspect of the present invention is a substrate with light reflection film including a base material and a light reflection film in which the light reflection film having convex portions or concave portions is included, wherein a pattern formed from the convex portions or the concave portions has an irregular arrangement in each unit defined by a plurality of dots.

As described above, since the convex portions or the concave portions are arranged in the direction of the plane on a random basis in units of, for example, 3 dots, 6 dots, or 12 dots of RGB dots corresponding to the pixel, excellent light scattering effect can be exhibited and occurrence of interference fringes can be prevented effectively.

In the configuration of the substrate with light reflection film according to the present invention, preferably, the heights of the convex portions or the depths of the concave portions are specified to be substantially the same on the surface.

For example, the substrate with light reflection film includes a base material and a light reflection film, and the heights of the plurality of convex portions or depths of the plurality of concave portions formed on the surface of the base material independent of each other are specified to be substantially the same.

By specifying the heights of the plurality of convex portions or depths of the plurality of concave portions to be substantially the same as described above, manufacture can be performed with ease and, in addition, uniform reflection characteristics can be achieved.

When the heights of the plurality of convex portions or depths of the plurality of concave portions are specified to be substantially the same as described above, and the structure is relatively flat, even in the case of combination with a light scattering film or a protection plate of a liquid crystal display device, degradation of the display quality due to concavities and convexities of gaps can be effectively suppressed, respectively.

In the configuration of the substrate with light reflection film according to the present invention, preferably, the diameters of the plurality of convex portions or concave portions are specified to be values within the range of 3 to 15 μm.

For example, preferably, the two-dimensional shapes of the plurality of convex portions or the concave portions are specified to be the two-dimensional shapes of independent circles and polygons, or of either of them, respectively and, in addition, the diameters thereof are specified to be values within the range of 3 to 15 μm.

In the configuration of the substrate with light reflection film according to the present invention, preferably, the intervals among the plurality of convex portions or concave portions are specified to be values within the range of 3.5 to 30 μm.

In the configuration of the substrate with light reflection film according to the present invention, preferably, the heights of the plurality of convex portions or the depths of the plurality of concave portions are specified to be values within the range of 0.1 to 10 μm.

In the configuration of the substrate with light reflection film according to the present invention, preferably, the unit is defined by a plurality of dots fewer than the number of the dot regions of the whole substrate, and a plurality of units are included in order to constitute the whole substrate.

In the configuration of the substrate with light reflection film according to the present invention, preferably, the plurality of convex portions having different diameters or the plurality of concave portions having different diameters are provided.

A substrate with light reflection film according to another aspect of the present invention is the substrate with light reflection film in which a light reflection film is formed on a substrate including a plurality of dot regions, wherein the light reflection film having convex portions or concave portions is included, and a pattern formed from the convex portions or the concave portions is formed in units of a plurality of dots, and has a symmetrical part in each of the units.

Another aspect according to the present invention is an electro-optical device including a plurality of dot regions, provided with a substrate on which a light reflection film having convex portions or concave portions is formed, and an electro-optical layer supported by the substrate, wherein a pattern formed from the convex portions or the concave portions has an irregular arrangement in a unit defined by a plurality of dots.

In the configuration of the electro-optical device according to the present invention, preferably, the heights of the convex portions or the depths of the concave portions are specified to be substantially the same on the surface.

In the configuration of the electro-optical device according to the present invention, preferably, the unit (basic unit) is defined by a plurality of dots fewer than the number of the dot regions of the whole surface, and a plurality of units are included in order to constitute the whole substrate.

In the configuration of the electro-optical device according to the present invention, preferably, one pixel is formed from a plurality of colored layers, which are placed corresponding to a plurality of dots and which have different colors, and the plurality of dots corresponding thereto, and at least one pixel corresponds in each unit.

An electro-optical device according to another aspect of the present invention is the electro-optical device including a plurality of dot regions, provided with a substrate on which a light reflection film having convex portions or concave portions is formed, and an electro-optical layer supported by the substrate, wherein a pattern formed from the convex portions or concave portions is formed in units of a plurality of dots and has a symmetrical part in each of the units.

In the configuration of the electro-optical device according to the present invention, preferably, one pixel is formed from a plurality of colored layers, which are placed corresponding to a plurality of dots and which have different colors, and the plurality of dots corresponding thereto, and at least one pixel corresponds in each of the units.

An electro-optical device according to another aspect of the present invention is the electro-optical device provided with an electro-optical layer, a light scattering film placed on one side of the electro-optical layer, and a light reflection film placed on the other side of the electro-optical layer, wherein irregularly arranged convex portions or concave portions are formed on the light reflection film.

In the configuration of the electro-optical device according to the present invention, preferably, the haze value of the light scattering film used concurrently is 10% or more, but 60% or less.

In the configuration of the electro-optical device according to the present invention, preferably, a plurality of dot regions are included, a pattern formed from the convex portions or the concave portions has an irregular arrangement in each unit defined by one dot or two dots, and the haze value of the light scattering film used concurrently is specified to be a value within the range of 40% to 60%.

In the configuration of the electro-optical device according to the present invention, preferably, one pixel is formed from a plurality of dot regions and a plurality of colored layers which are placed corresponding thereto and which have different colors, and at least one pixel corresponds to each unit.

In the configuration of the electro-optical device according to the present invention, preferably, a plurality of dot regions are included, a pattern formed from the convex portions or the concave portions has an irregular arrangement in each unit defined by three or more dots, and the haze value of the light scattering film used concurrently is 10% or more, but 40% or less.

In the configuration of the electro-optical device according to the present invention, preferably, a protection plate placed on the one side is provided.

Another aspect according to the present invention is an electronic apparatus including an electro-optical device as a display portion. Adopted as the electro-optical device is an electro-optical device including a plurality of dot regions and provided with a substrate, on which a light reflection film having convex portions or concave portions is formed, and an electro-optical layer supported by the substrate, with a pattern formed from the convex portions or concave portions including an irregular arrangement in each unit defined by a plurality of dots.

Another aspect according to the present invention is an electronic apparatus including an electro-optical device as a display portion. Adopted as the electro-optical device is an electro-optical device provided with a substrate, on which a light reflection film having convex portions or concave portions is formed, and an electro-optical layer supported by the substrate, with a pattern formed from the convex portions or concave portions being formed in units of a plurality of dots and having a symmetrical part in each of the units.

Another aspect according to the present invention is an electronic apparatus including an electro-optical device as a display portion. Adopted as the electro-optical device is an electro-optical device provided with an electro-optical layer, a light scattering film placed on one side of the electro-optical layer, and a light reflection film placed on the other side of the electro-optical layer, with irregularly arranged convex portions or concave portions being formed on the light reflection film.

Another aspect according to the present invention is a method for forming a light reflection film on a base material including a plurality of dot regions, provided with a step of coating the base material with a photosensitive material, a step of exposing the photosensitive material, a step of forming concavities and convexities on the photosensitive material exposed, and a step of forming a light reflection film on the concavities and convexities, wherein a pattern of the concavities and convexities is formed in units of a plurality of dots fewer than the number of the dot regions and has an irregular arrangement in each of the units.

Another aspect regarding a method for forming a light reflection film according to the present invention is the method for forming a light reflection film on a base material including a plurality of dot regions, provided with a step of coating the base material with a photosensitive material, a step of exposing the photosensitive material, a step of forming concavities and convexities on the photosensitive material exposed, and a step of forming a light reflection film on the concavities and convexities, wherein a pattern of the concavities and convexities is formed in units of a plurality of dots and has a symmetrical part in each of the units.

A manufacturing method for an electro-optical device according to the present invention includes steps of the method for forming a light reflection film on a base material including a plurality of dot regions, provided with a step of coating the base material with a photosensitive material, a step of exposing the photosensitive material, a step of forming concavities and convexities on the photosensitive material exposed, and a step of forming a light reflection film on the concavities and convexities, wherein a pattern of the concavities and convexities is formed in units of a plurality of dots fewer than the number of the dot regions of the whole substrate and has an irregular arrangement in each of the units.

Another manufacturing method for an electro-optical device according to the present invention includes steps of the method for forming a light reflection film on a base material including a plurality of dot regions, provided with a step of coating the base material with a photosensitive material, a step of exposing the photosensitive material, a step of forming concavities and convexities on the photosensitive material exposed, and a step of forming a light reflection film on the concavities and convexities, wherein a pattern of the concavities and convexities is formed in units of a plurality of dots and has a symmetrical part in each of the units.

BRIEF DESCRIPTION OF THE DRAWINGS

FIG. 21 is a plan view and a sectional view of a substrate with light reflection film made of a concave portion in which substantially, the horizontal cross-section is a parabola having a small curvature radius and the vertical cross-section is a parabola having a curvature radius larger than that.

DETAILED DESCRIPTION OF THE PREFERRED EMBODIMENTS

Embodiments according to the present invention will be described below with reference to the drawings. It is needless to say that each embodiment described below shows one aspect of the present invention, does not specifically limit the present invention, and can be arbitrarily modified within the scope of the technical idea of the present invention.

First Embodiment

The first embodiment is a mask for forming a pattern on a substrate including a plurality of dot regions, provided with light transmission portions which can transmit incident light and light non-transmission portions which, substantially, do not transmit light, wherein a pattern formed from the light transmission portions or light non-transmission portions is formed in units of dots, the number thereof being smaller than the number of the dot regions, and has an irregular arrangement in each of the units, and a plurality of units are included.

Figure 2:
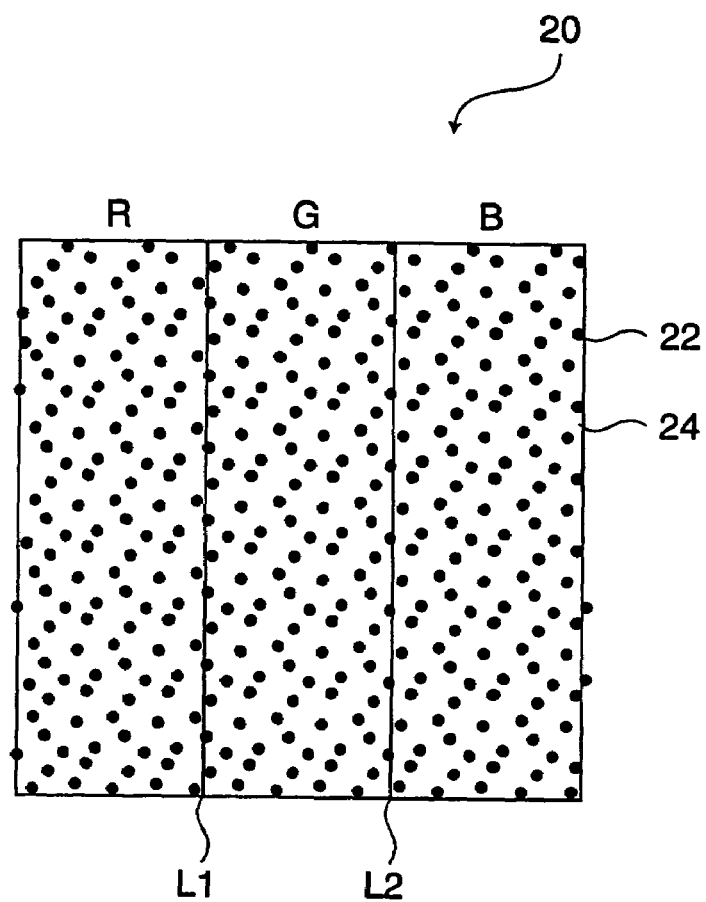
FIG. 2 is a plan view for explaining a mask in which light transmission portions or light non-transmission portions are arranged in units of one pixel (RGB: 3 dots) in the direction of the plane on a random basis.

That is, for example, the mask is a mask 20 as shown in FIG. 2 for manufacturing a substrate with light reflection film, wherein light transmission portions or light non-transmission portions 22 have the two-dimensional shapes of independent circles and polygons, or of either of them, and are arranged in the direction of the plane on a random basis in units of RGB dots corresponding to the predetermined pixel.

Light Transmission Portion and Light Non-Transmission Portion (1) Shape

Figure 1:
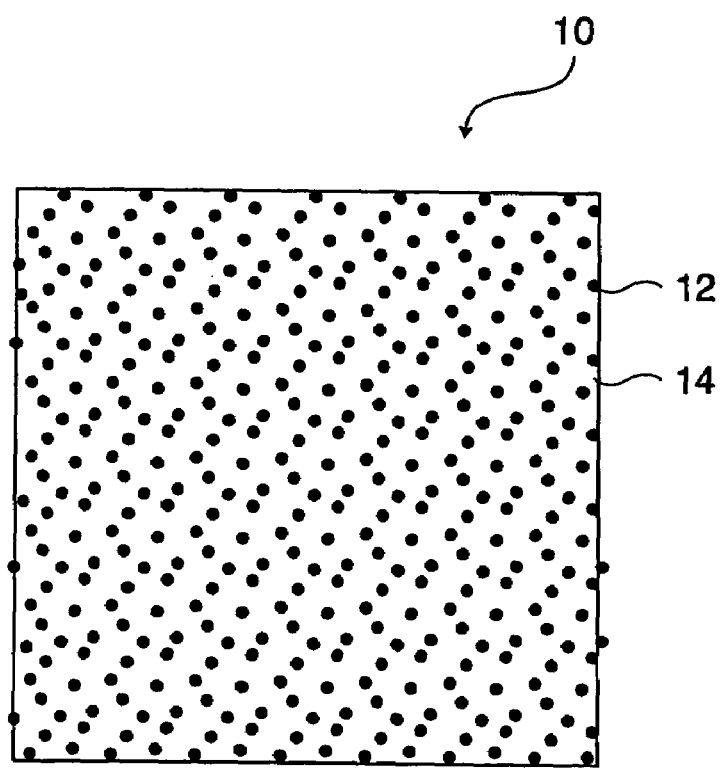
FIG. 1 is a plan view for explaining a mask according to the present invention.

Preferably, the light transmission portions or light non-transmission portions have the two-dimensional shapes of independent circles (ellipses are included.) and polygons, or of either of them, as shown in FIG. 1.

This is because when exposure process for manufacturing the substrate with the light reflection film is performed, it becomes possible to complicate the concavity and convexity arrangement of a resin by making the light transmission portion or light non-transmission portion have the two-dimensional shape of a circle (an ellipse is included) or a polygon. Furthermore, since the circle and polygon are basic patterns, manufacture of the mask itself becomes easy. Examples of preferable polygons include, for example, a tetragon, pentagon, hexagon, and octagon.

(2) Diameter and Interval

The diameters of the light transmission portions or light non-transmission portions in the mask are preferably specified to be within the range of 3 to 15 μm.

This is because when the diameter of the light transmission portion or light non-transmission portion is less than 3 μm, in manufacture of the substrate with light reflection film, it may be difficult to precisely control the two-dimensional shapes and arrangement patterns of the convex portions and concave portions even if an exposure process is used. Furthermore, when the diameter of the light transmission portion or light non-transmission portion is less than 3 μm, it may be difficult to manufacture the mask itself.

On the other hand, when the diameter of the light transmission portion or light non-transmission portion exceeds 15 μm, it becomes difficult to scatter light moderately regarding the resulting substrate with light reflection film and, therefore, scattering characteristic is degraded and reflection is darkened.

Consequently, the diameters of the light transmission portions or light non-transmission portions in the mask are more preferably specified to be values within the range of 5 to 13 μm, and further preferably, are specified to be values within the range of 6 to 12 μm.

The diameter of at least one of the light transmission portions or light non-transmission portions in the mask is preferably specified to be 5 μm or more. That is, when there are light transmission portions or light non-transmission portions having different diameters, the diameter of at least one of the light transmission portions or light non-transmission portions is specified to be 5 μm or more. The diameters of other light transmission portions or light non-transmission portions having different diameters may be less than 5 μm.

This is because when such a two-dimensional shape of every light transmission portion or light non-transmission portion is a circle or polygon of less than 5 μm, in many cases, the light is excessively scattered and reflection is darkened regarding the resulting substrate with light reflection film. However, when the diameters of the light transmission portions or light non-transmission portions are increased excessively, the light scattering effect may be reduced and, therefore, interference fringes may occur.

Consequently, the diameter of at least one of the light transmission portions or light non-transmission portions in the mask is preferably specified to be within the range of 5 to 13 μm, and more preferably, is specified to be a value within the range of 6 to 12 μm.

The intervals (pitches) among the light transmission portions or light non-transmission portions in the mask are preferably specified to be within the range of 3.5 to 30 μm.

This is because when the intervals among the light transmission portions or light non-transmission portions are less than 3.5 μm, independence of the light transmission portions or light non-transmission portions may be reduced. On the other hand, when the intervals among the light transmission portions or light non-transmission portions exceed 30 μm, randomness in arrangement of the light transmission portions or light non-transmission portions may be reduced.

Consequently, the intervals (pitches) among the light transmission portions or light non-transmission portions in the mask are more preferably specified to be within the range of 5 to 20 μm, and the intervals (pitches) among the light transmission portions or light non-transmission portions in the mask are further preferably specified to be within the range of 7 to 15 μm.

Such an interval between the light transmission portions or light non-transmission portions refers to a distance between centers of adjacent light transmission portions or light non-transmission portions, and refers to an average of 10 portions or more.

(3) Sort

Figure 5:
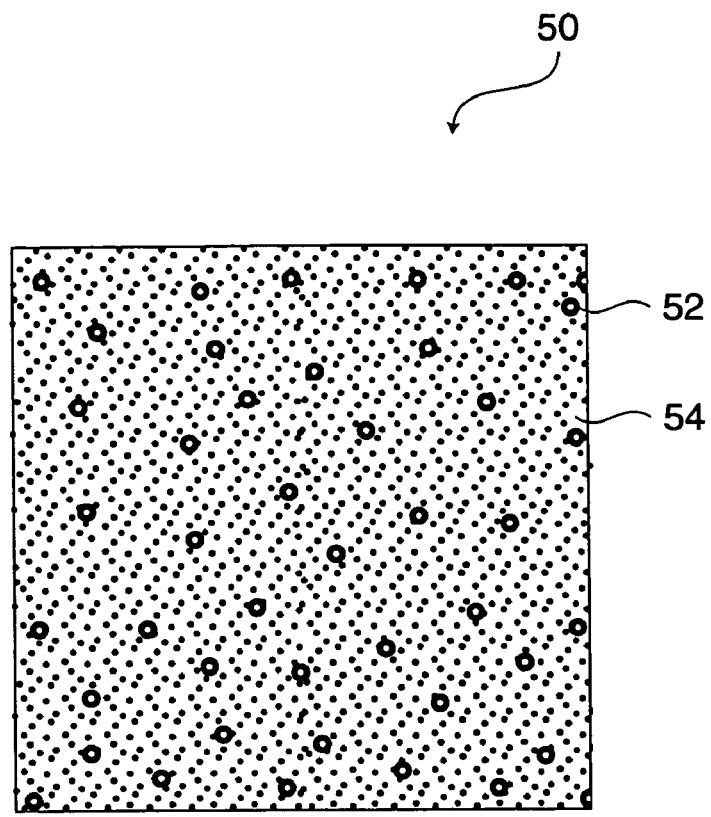
FIG. 5 is a plan view for explaining a mask in which the diameters of the light transmission portions or light non-transmission portions are different.

Preferably, the diameters of the light transmission portions or light non-transmission portions in the mask are differentiated, and 2 to 10 sorts of light transmission portions or light non-transmission portions are placed. For example, as shown in FIG. 5, the light transmission portions or light non-transmission portions having different diameters are placed in one random pattern.

This is because the substrate with light reflection film which brings about few interference fringes can be manufactured further efficiently by existence of the light transmission portions or light non-transmission portions having different diameters as described above. That is, in manufacture of the substrate with light reflection film by the use of such a mask, the resulting arrangement of convex portions or concave portions is further dispersed and, therefore, the light can be scattered moderately. Consequently, when such a substrate with light reflection film is used for a liquid crystal display device, etc., occurrence of interference fringes can be prevented further effectively.

Combinations of patterns formed from the light transmission portions or light non-transmission portions having different diameters in the mask can include the following examples.

1) The combination of a hexagonal pattern of 7.5 μm and a hexagonal pattern of 9 μm,
2) the combination of a hexagonal pattern of 5 μm, a hexagonal pattern of 7.5 μm, and a hexagonal pattern of 9 μm, and
3) the combination of a square pattern of 4.5 μm, a square pattern of 5 μm, a hexagonal pattern of 7.5 μm, a hexagonal pattern of 9 μm, and a hexagonal pattern of 11 μm are preferable.

(4) Area Ratio

The area ratio of the light transmission portions or light non-transmission portions in the mask is preferably specified to be within the range of 10% to 60% relative to the total area.

This is because when such an area ratio is less than 10%, in manufacture of the substrate with light reflection film, the area occupied by a plurality of convex portions or concave portions is reduced, and flat portions are increased and, therefore, the light scattering effect may be reduced remarkably. On the other hand, when such an area ratio exceeds 60%, flat portions are increased and, therefore, the light scattering effect may also be reduced remarkably.

Consequently, the area ratio of the light transmission portions or light non-transmission portions in the mask is more preferably specified to be within the range of 15% to 50% relative to the total area, and further preferably, is specified to be within the range of 20% to 40%.

When a positive type is used as a photosensitive resin constituting the base material, since the portion radiated with light that passed through the light transmission portion is photolyzed so as to be solubilized with respect to a developer, the area ratio of the light non-transmission portions in the mask becomes significant. When a negative type is used, since the portion radiated with light that passed through the light transmission portion is exposed so as to be insolubilized with respect to the developer, the area ratio of the light transmission portions in the mask becomes significant.

2. Random Arrangement (1) Random Arrangement 1

In the first embodiment, for example, as shown in FIG. 1, light transmission portions or light non-transmission portions 12 in a mask 10 are arranged in the direction of the plane on a random basis.

This is because when the substrate with light reflection film is formed using such a mask by an exposure process, a plurality of convex portions or concave portions can be easily arranged on a random basis relative to the base material and, therefore, light can be scattered moderately.

Although the random arrangement briefly describes that the light transmission portions or light non-transmission portions are arranged on a random basis, to be more precise, describes the condition that when the mask is divided on a unit area basis, and those masks are overlaid with one another, each pattern is completely different from the others or does not completely match the others even though some parts overlap.

(2) Random Arrangement 2

Preferably, the light transmission portions or light non-transmission portions of the mask pattern for a light reflection film are arranged in the direction of the plane on a random basis with respect to RGB dots forming a pixel in a liquid crystal display device, etc., for which the light reflection film is used.

That is, preferably, arrangement in the direction of the plane on a random basis is performed in units of one pixel (RGB: 3 dots), two pixels (RGB: 6 dots), or four pixels (RGB: 12 dots) in a liquid crystal display device, etc., for which the light reflection film is used, and the unit is repeated.

Figure 3:
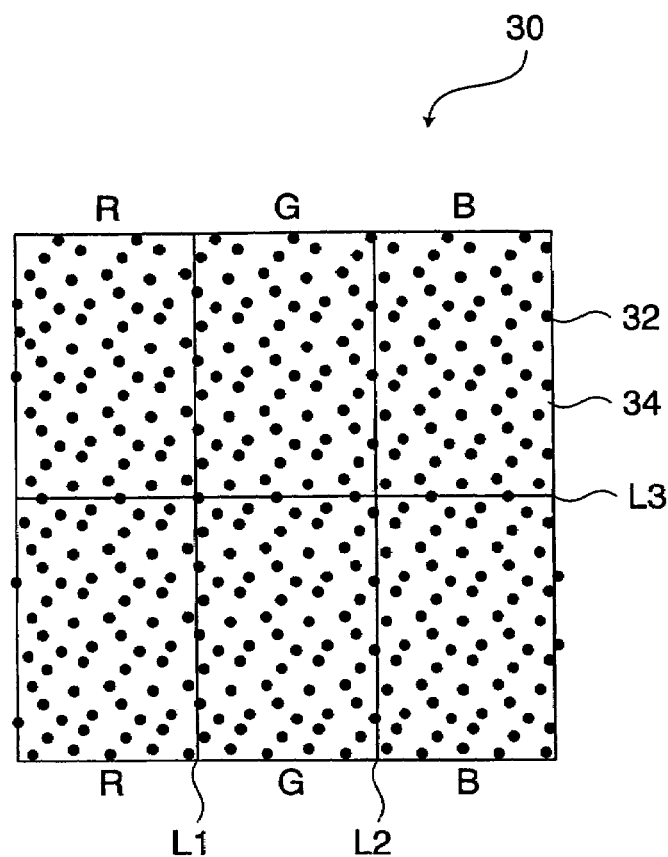
FIG. 3 is a plan view for explaining a mask in which light transmission portions or light non-transmission portions are arranged in units of two pixels (RGB: 6 dots) in the direction of the plane on a random basis.
Figure 4:
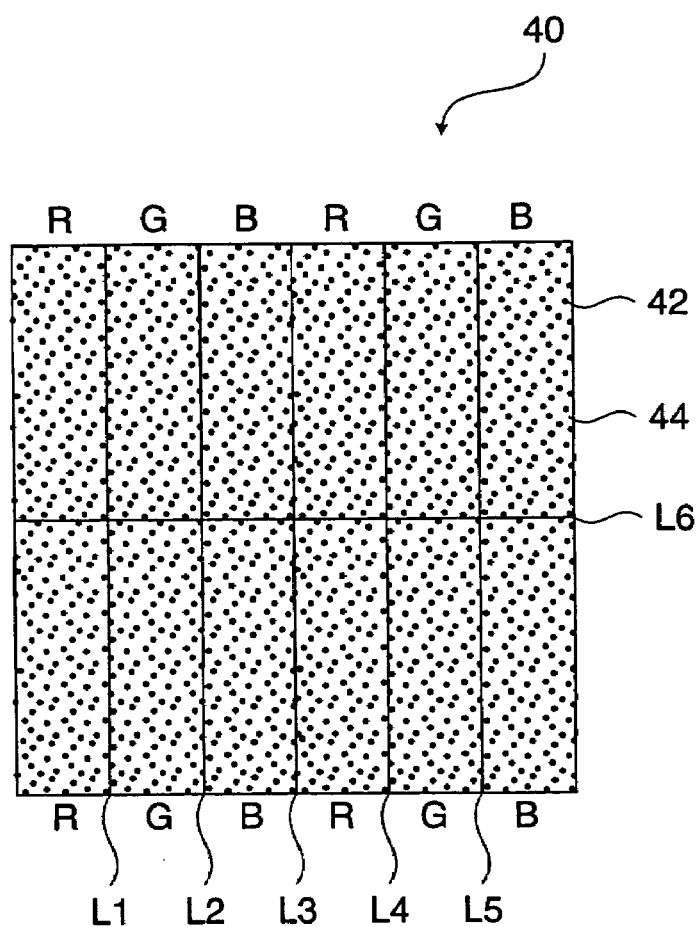
FIG. 4 is a plan view for explaining a mask in which light transmission portions or light non-transmission portions are arranged in units of four pixels (RGB: 12 dots) in the direction of the plane on a random basis.

For example, a random pattern composed of light transmission portions or light non-transmission portions 22 may be repeated using a unit including three RGB dots, which are divided by lines L1 and L2 in the vertical direction, as shown in FIG. 2. A random pattern composed of light transmission portions or light non-transmission portions 32 may be repeated in units of six sorts of RGB dots, each being divided by lines L1 and L2 in the vertical direction and a line L3 in the horizontal direction, as shown in FIG. 3. Furthermore, as shown in FIG. 4, a random pattern composed of light transmission portions or light non-transmission portions 42 may be repeated in units of twelve sorts of RGB dots, each being divided by lines L1 to L5 in the vertical direction and a line L6 in the horizontal direction.

This is because by making the mask have a pattern in basic units of a group of some RGB dots described above, a plurality of convex portions or concave portions in the light reflection film produced therethrough scatter the light moderately and, therefore, occurrence of interference fringes can be prevented effectively. Furthermore, this is because since patterning is performed in basic units of a group of some RGB dots, information content regarding the pattern can be reduced and, therefore, positional adjustment of the pattern and the like become easy during manufacture of the light reflection film.

In the present invention, regarding the case where the light transmission portions or light non-transmission portions of the mask pattern for the light reflection film are arranged in the direction of the plane on a random basis with respect to RGB dots in a liquid crystal display device, etc., a member including a pixel, for example, a color filter is not necessarily used concurrently, and it is essential that a predetermined random pattern is eventually formed in units of RGB dots.

(3) Random Arrangement 3

In the configuration of the mask, preferably, the mask is divided by at least one virtual line, and a pattern formed from the light transmission portions or light non-transmission portions is arranged in mirror plane symmetry with respect to the virtual line.

According to such a configuration, the substrate with light reflection film which brings about few interference fringes can be manufactured further efficiently. That is, when the substrate with light reflection film is manufactured, since light can be scattered moderately by the use of a plurality of convex portions or concave portions being in the mirror plane symmetry pattern, occurrence of interference fringes can be prevented further effectively. Since the mirror plane symmetry pattern is used, the same pattern can be formed by rotational movement. Consequently, information content regarding the pattern can be reduced and, therefore, manufacture of the substrate with light reflection film becomes easy.

Figure 6:
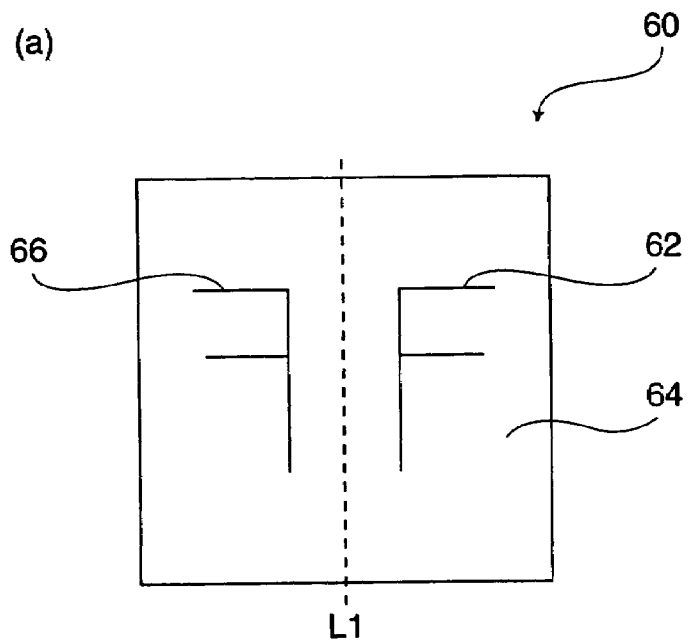
FIG. 6 is a plan view for explaining a mask in which the light transmission portions or light non-transmission portions are in mirror plane symmetry.
Figure 6:
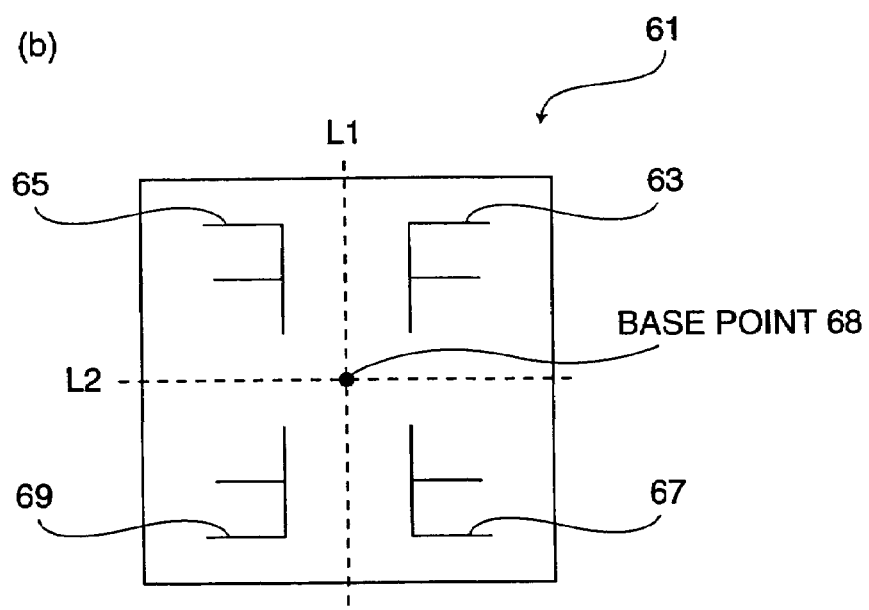

Herein, the mirror plane symmetry pattern as the random arrangement will be described further specifically with reference to FIGS. 6(a) and 6(b). In FIGS. 6(a) and 6(b), in order that relationship of the mirror plane symmetry pattern can be understood with ease, the pattern formed from the light transmission portions or light non-transmission portions in the shape of circles or polygons is indicated by a letter pattern (F).

As shown in FIG. 6(a), preferably, letter patterns (F) composed of a plurality of convex portions or concave portions are arranged in mirror plane symmetry, that is, bilateral symmetry, with respect to a virtual line (L1). This is because according to such a configuration, when one of the patterns is used, the other pattern can be formed by reversing it.

As shown in FIG. 6(b), preferably, the letter patterns (F) composed of a plurality of convex portions or concave portions are arranged in bilateral symmetry and vertical symmetry, each being mirror plane symmetry, with respect to two virtual lines (L1 and L2). This is because according to such a configuration, by the use of one letter pattern 63, other three patterns can be formed. That is, a letter pattern 65 can be formed by reversing the letter pattern 63 with respect to L1 as an axis. A letter pattern 67 can be formed by reversing the letter pattern 63 with respect to L2 as an axis. Furthermore, a letter pattern 69 can be formed by rotating the letter pattern 63 180° about a base point 68.

In all cases where the patterns are in mirror plane symmetry, the patterns produced using the virtual line as an axis of symmetry cannot be coincidently superimposed one another in the vertical direction and, therefore, can bring about moderate light scattering as a sort of random pattern defined in the present invention.

Second Embodiment

The second embodiment is a substrate with light reflection film, in which a light reflection film is formed on a substrate including a plurality of dot regions, wherein the light reflection film having convex portions or concave portions is included, and a pattern formed from the convex portions or concave portions has an irregular arrangement in each unit defined by a plurality of dots.

Figure 7:
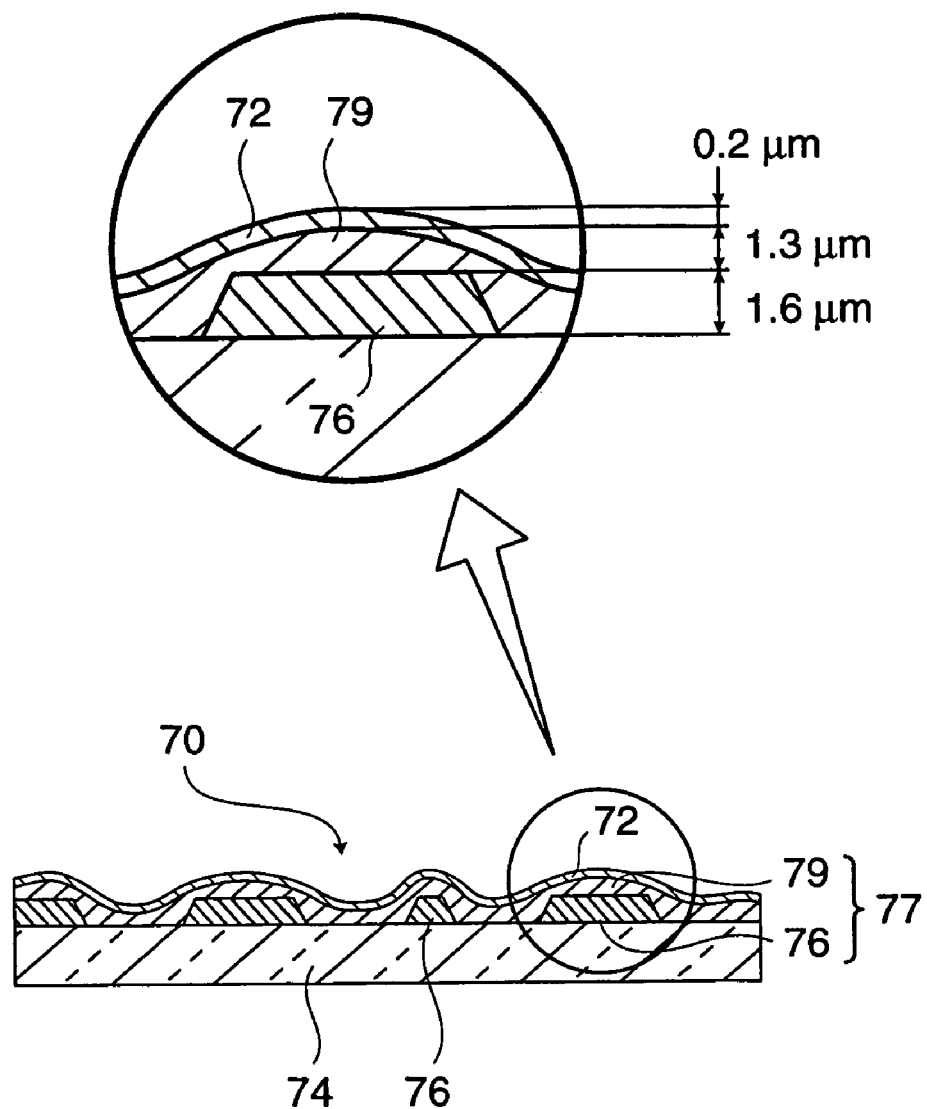
FIG. 7 is a sectional view of a substrate with light reflection film including the first substrate and the second substrate.

That is, in the case shown in FIG. 7 as an example, where a negative type photosensitive resin is used, a substrate 70 with light reflection film includes a base material 77 and a reflection layer 72, the heights of a plurality of convex portions 76 or the depths of a plurality of concave portions formed on the base material 77 are specified to be substantially the same, the two-dimensional shapes of the plurality of convex portions 76 are specified to be the two-dimensional shapes of independent circles and polygons, or of either of them, and the plurality of convex portions 76 are arranged in the direction of the plane on a random basis.

1. Base Material

Regarding the configuration of the base material, as shown in FIG. 7, first base materials 76 and a second base material 79 are included in that order from the bottom, the first base materials 76 are composed of a plurality of convex portions independent of each other, and the second base material 79 is a continuous layer.

According to such a configuration, since a reflection layer 72 formed on the second base material 79, which is a continuous layer interposed, can be made to have a relatively gently curved surface, when it is used for a liquid crystal display device, etc., occurrence of interference fringes can be prevented effectively. As a preferred example, the case where the base material 77 is composed of the first base materials 76 and the second base material 79 in that order from the bottom, as shown in FIG. 7, will be described below.

(1) First Base Material

In the first base materials, preferably, the heights of the plurality of convex portions or the depths of the plurality of concave portions independent of each other are specified to be values within the range of 0.5 to 5 μm.

This is because when such heights of the convex portions or depths of the concave portions become values less than 0.5 μm, it may become difficult to place a reflection layer having a moderately curved surface with the second base material therebetween. On the other hand, when such heights of the convex portions or depths of the concave portions exceed 5 μm, concavities and convexities of the reflection layer become large and, therefore, the light may be excessively scattered, or break may become likely to occur.

Consequently, in the first base materials, the heights of the plurality of convex portions or the depths of the plurality of concave portions independent of each other are more preferably specified to be values within the range of 0.8 to 4 μm, and further preferably, are specified to be values within the range of 1 to 3 μm.

(2) Second Base Material

In the second base material, preferably, the heights of the continuous convex portions or the depths of the continuous concave portions are specified to be values within the range of 0.1 to 3 μm.

This is because when such heights of the convex portions or depths of the concave portions become values less than 0.1 μm, it may be difficult to place a reflection layer having a moderately curved surface thereon. On the other hand, when such heights of the convex portions or depths of the concave portions exceed 3 μm, concavities and convexities of the reflection layer formed thereon become large and, therefore, the light may be excessively scattered, or break may become likely to occur.

Consequently, in the second base material, the heights of the plurality of convex portions or the depths of the plurality of concave portions independent of each other are more preferably specified to be values within the range of 0.1 to 2 μm, and further preferably, are specified to be values within the range of 0.3 to 2 μm.

(3) A Plurality of Convex Portions or Concave Portions i) Two-Dimensional Shapes of Convex Portions or Concave Portions Preferably, the two-dimensional shapes of the plurality of convex portions or concave portions formed on the base material are preferably the two-dimensional shapes of independent circles and polygons, or of either of them.

This is because when the two-dimensional shapes are made to be the shapes of independent circles and polygons, or of either of them, the two-dimensional shapes and the arrangement pattern of the plurality of convex portions or concave portions can be controlled with precision by the use of an exposure process. Furthermore, this is because the convex portions or concave portions having the two-dimensional shapes described above can scatter light and can effectively prevent occurrence of interference fringes.

Figure 8:
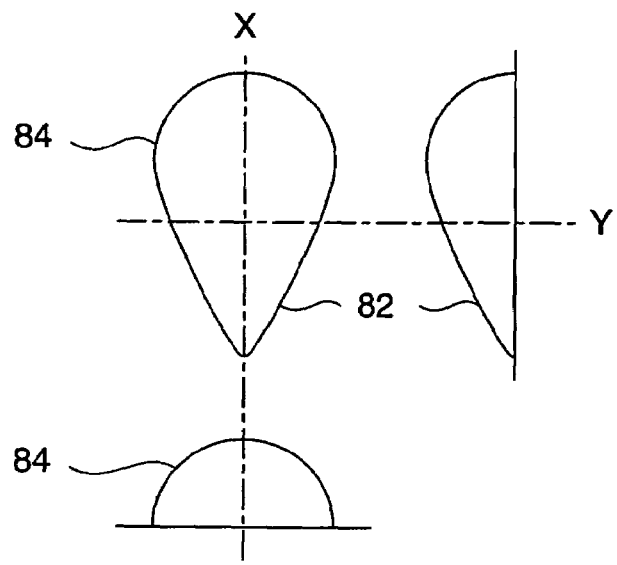
FIG. 8 is a plan view and a sectional view of a substrate with light reflection film made of an asymmetrical substantially tear-shaped convex portion, etc.
Figure 8:
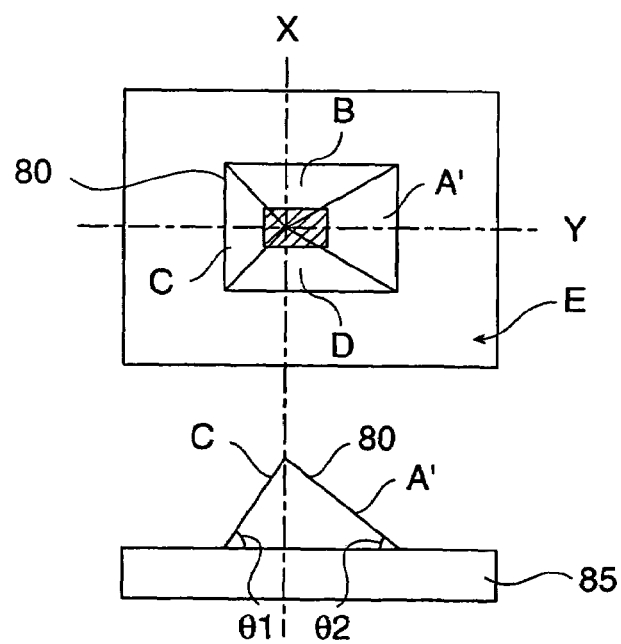

Preferred examples of two-dimensional shapes of the convex portions include, for example, an offset ellipse (the shape of a liquid droplet) shown in FIG. 8(a) and an offset tetragon (pyramid-shaped) shown in FIG. 8(b), or preferred examples of two-dimensional shapes of the concave portions include, for example, the shape of an elliptical dome and the shape of an oblong dome shown in FIG. 18 to FIG. 22.

Figure 9:
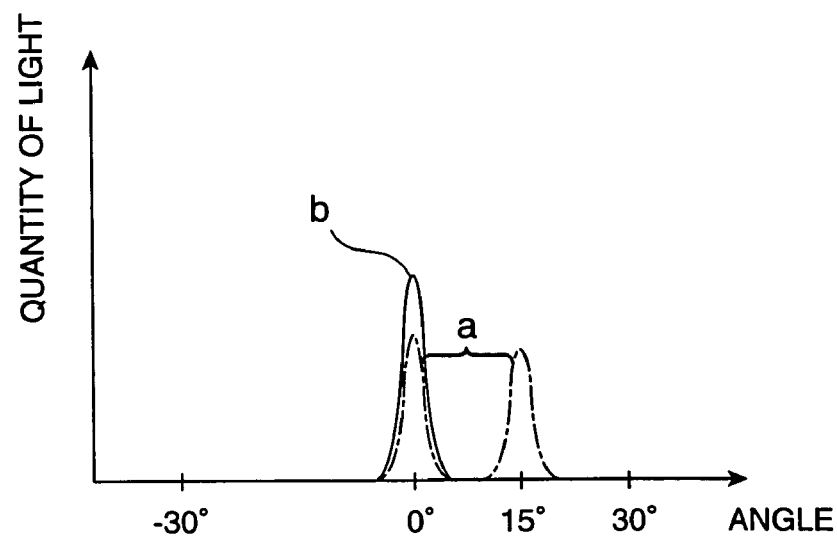
FIG. 9 is a diagram showing the relationship between the quantity of light visually detected and the angle of visual identification.

This is because when the two-dimensional shapes of the plurality of convex portions or concave portions are specified to be the aforementioned shapes, in cooperation with the inclined surface in the direction of the height, light directivity is improved while a predetermined light scattering property is maintained, as shown in FIG. 9. In FIG. 9, alternate long and short dashed lines a indicate the quantity of light visually detected in the case of the offset ellipse as shown in FIG. 8(a), and a solid line b indicates the quantity of light visually detected in the case of a uniform circle which is not offset. Consequently, by adopting such a two-dimensional shape, when viewed from a specified direction, for example, the quantity of light incident upon the eye at the position at an angle of +15° is increased and, therefore, a bright image can be recognized at that position.

ii) Diameters of Convex Portions or Concave Portions

Regarding the plurality of convex portions or concave portions formed on the base material, the diameters of the convex portions or concave portions are preferably specified to be values within the range of 3 to 15 µm.

This is because when the plurality of convex portions or concave portions have the diameters within such a range, the two-dimensional shapes and the arrangement pattern can be controlled with precision by the use of an exposure process and, in addition, light can be scattered moderately and occurrence of interference fringes can be prevented effectively. Furthermore, this is because when the plurality of convex portions or concave portions have the diameters within such a range, it becomes less likely that stain patterns indefinite in shape are visually detected.

Consequently, the diameters of the plurality of convex portions or concave portions are more preferably specified to be within the range of 5 to 13 µm, and further preferably, are specified to be within the range of 6 to 12 µm.

iii) Heights of Convex Portions and Depths of Concave Portions

Regarding the plurality of convex portions or concave portions formed on the base material, the heights of the convex portions and depths of the concave portions are preferably specified to be values within the range of 0.1 to 10 µm.

This is because when such heights of the convex portions or depths of the concave portions become values less than 0.1 µm, even if the exposure process is used, the convexities or concavities become small and, therefore, the scattering characteristic is degraded. On the other hand, when such heights of the convex portions or depths of the concave portions exceed 10 µm, concavities and convexities of the reflection layer become large and, therefore, the light may be excessively scattered, or break may become likely to occur.

Consequently, the heights of the convex portions or depths of the concave portions are more preferably specified to be values within the range of 0.2 to 3 µm, and further preferably, are specified to be values within the range of 0.3 to 2 µm.

iv) Random Arrangement 1

Preferably, a plurality of convex portions or concave portions formed on the base material surface, in particular, the heights of the plurality of convex portions or the depths of the plurality of concave portions constituting the first base material, are specified to be substantially the same and, in addition, the plurality of convex portions or concave portions are arranged in the direction of the plane on a random basis.

This is because when the plurality of convex portions or concave portions are arranged regularly, in the use for a liquid crystal display device, etc., interference fringes may occur and, therefore, the image quality may be degraded remarkably.

The reason such heights of the plurality of convex portions or depths of the plurality of concave portions are specified to be substantially the same is that conversely, when the heights of the plurality of convex portions or the depths of the plurality of concave portions are differentiated as described in Japanese Unexamined Patent Application Publication No. 6-27481 and Japanese Unexamined Patent Application Publication No. 11-281972, manufacture may become difficult and occurrence of interference fringes may not be prevented with stability.

Preferably, the diameters of the plurality of convex portions or concave portions are differentiated, and 2 to 10 sorts of the convex portions or concave portions are placed.

This is because according to such a configuration, complicated light reflection, which cannot be achieved by one sort of convex portions or concave portions, can be made possible and, therefore, the light can be further dispersed and be scattered.

Consequently, by placing the plurality of convex portions or concave portions having different diameters, occurrence of interference fringes can be prevented further effectively.

v) Random Arrangement 2

Preferably, a plurality of convex portions or concave portions are arranged in the direction of the plane on a random basis in units of one pixel (RGB: 3 dots), two pixels (RGB: 6 dots), or four pixels (RGB: 12 dots) in the liquid crystal display device, etc., for which the light reflection film is used.

This is because even a plurality of convex portions are in units of some RGB dots, the plurality of convex portions scatter the light moderately and, therefore, occurrence of interference fringes can be prevented effectively. Furthermore, this is because since patterning is performed in basic units of RGB dots, information content regarding the pattern can be reduced and, therefore, positional adjustment of the pattern and the like become easy during manufacture of the light reflection film.

As described above, such a random arrangement can be easily formed by the exposure process through the mask pattern for the light reflection film as shown in FIG. 2 to FIG. 4.

vi) Random Arrangement 3

Preferably, the base material is divided by a virtual line, and a plurality of convex portions or concave portions are arranged in mirror plane symmetry with respect to the virtual line.

According to such a configuration, since light can be scattered moderately by taking advantage of the mirror plane symmetry arrangement, occurrence of interference fringes can be prevented further effectively. Since when the mirror plane symmetry pattern is used, agreement can be achieved by rotational movement, information content regarding the pattern can be reduced and, therefore, manufacture of the substrate with light reflection film becomes easy.

In manufacture of such a mirror plane symmetry pattern, the mask having the mirror plane symmetry pattern described in the first embodiment can be used suitably.

(4) Opening Portion

In the substrate with light reflection film, preferably, an opening portion for partially passing through light is placed. According to such a configuration, it is possible to use for a reflection transmission combination (transflective) type liquid crystal display device, etc.

Figure 10:
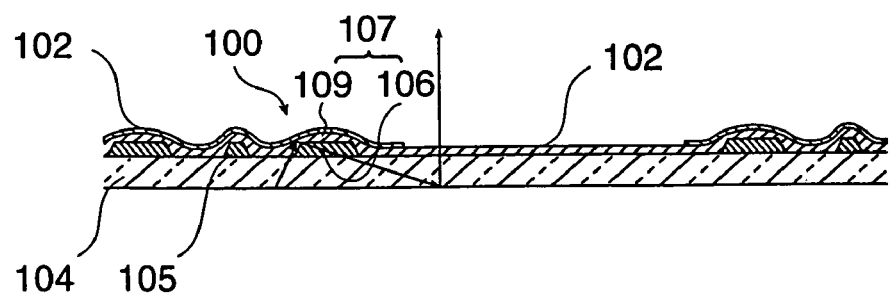
FIG. 10 is a sectional view of a substrate with light reflection film including an opening portion.

That is, as shown in FIG. 10, by placing an opening portion 102 in a part of a light reflection film 100, light from the outside can be reflected efficiently by the light reflection film 100 and, in addition, light emitted from the inside can be discharged to the outside through the opening portion 102.

The size of the opening portion is not specifically limited, and preferably, is determined depending on the use, etc., of the substrate with light reflection film. For example, it is preferably specified to be a value within the range of 5% to 80% when the total area of the substrate with light reflection film is assumed to be 100%, more preferably, is specified to be a value within the range of 10% to 70%, and further preferably, is specified to be a value within the range of 20% to 60%.

2. Reflection Layer (1) Thickness

The thickness of the reflection layer in the substrate with light reflection film is preferably specified to be a value within the range of 0.05 to 5 μm.

This is because when the thickness of such a reflection layer becomes a value less than 0.05 μm, the effect of reflecting may become poor remarkably. On the other hand, when the thickness of such a reflection layer exceeds 5 μm, the flexibility of the resulting substrate with light reflection film may be degraded, and manufacturing time may be excessively increased.

Consequently, the thickness of such a reflection layer is more preferably specified to be a value within the range of 0.07 to 1 μm, and further preferably, is specified to be a value within the range of 0.1 to 0.3 μm.

(2) Sort

The constituent material of the reflection layer is not specifically limited, and is preferably specified to be a metal material having excellent electrical conductivity and light reflection property, for example, aluminum (Al), silver (Ag), copper (Cu), gold (Au), chromium (Cr), tantalum (Ta), and nickel (Ni).

It is also preferable that a transparent conductive material, for example, indium tin oxide (ITO), indium oxide, or tin oxide, is used on the aforementioned reflection layer.

However, when such a metal material or transparent conductive material is used, in the case where dissolution into the liquid crystal occurs, it is also preferable that an electrical insulation film is placed on the surface of the reflection film made of the metal material, etc., the electrical insulation material is sputtered together with the metal material, etc., and the like.

(3) Undercoat Layer

When the reflection layer is formed on the second substrate, in order to improve adhesion and to make the reflection layer have a gently curved surface, preferably, a undercoat layer 0.01 to 2 μm in thickness is placed.

Examples of constituent materials of such a undercoat layer include, for example, a silane coupling agent, titanium coupling agent, aluminum coupling agent, aluminum-magnesium alloy, aluminum-silane alloy, aluminum-copper alloy, aluminum-manganese alloy, and aluminum-gold alloy, alone or in combination of at least two thereof.

(4) Mirror Reflectivity

The mirror reflectivity of the reflection layer is preferably specified to be a value within the range of 5% to 50%.

This is because when such a mirror reflectivity becomes less than 5%, in the use for a liquid crystal display device, etc., the brightness of the resulting display image may be reduced remarkably. On the other hand, when the mirror reflectivity exceeds 50%, scattering property may be degraded and, therefore, incorporation of the background and excessive mirror reflection of external light may occur.

Consequently, the mirror reflectivity of the reflection layer is more preferably specified to be a value within the range of 10% to 40%, and further preferably, is specified to be a value within the range of 15% to 30%.

Figure 14:
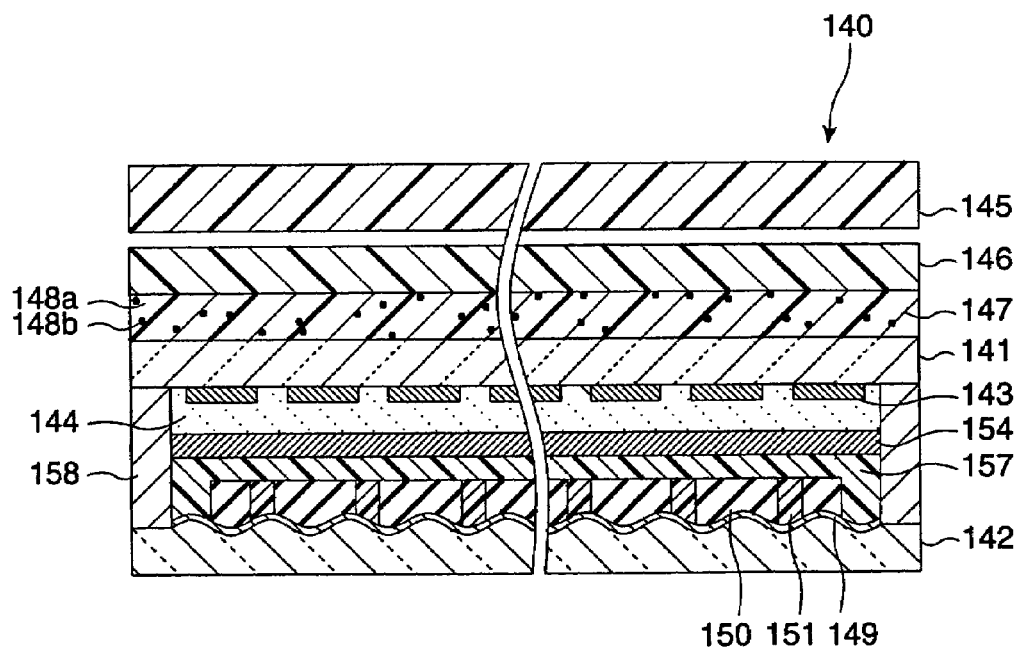
FIG. 14 is a sectional view showing the configuration of a liquid crystal display device of a passive matrix system.
Figure 15:
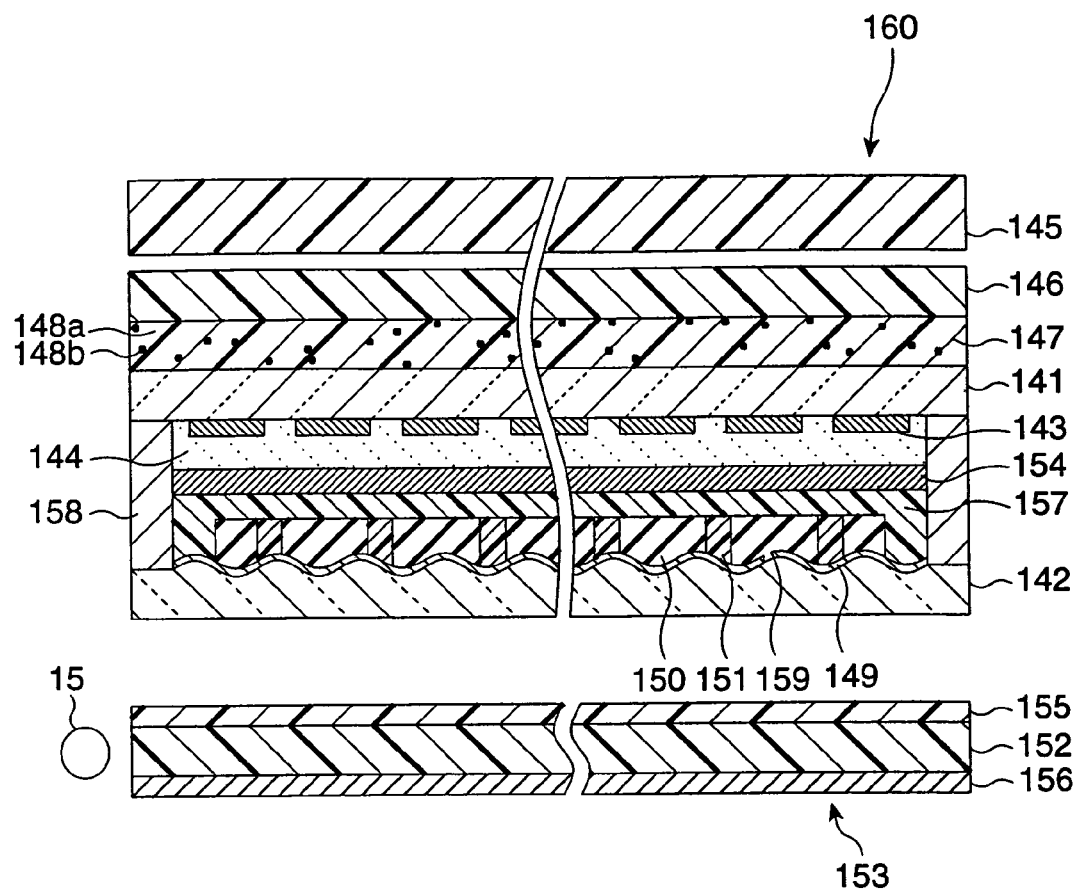
FIG. 15 is a sectional view showing the configuration of another liquid crystal display device.

Preferably, the aforementioned substrate with light reflection film is combined with other constituent members, for example, as shown in FIG. 14 and FIG. 15, color filters 150, light-shielding layers 151, an overcoat layer 157, a plurality of transparent electrodes 154, and an orientation film.

According to such a combination, members for a color liquid crystal display device, etc., which brings about few interference fringes, can be provided efficiently. For example, by combining the color filters 150 in stripe arrangement, mosaic arrangement, delta arrangement, or the like composed of three color elements of RGB (red, blue, and green), colorization can be performed with ease, and by further combination with the light-shielding layers 151, an image having excellent contrast can be produced. Although the substrate with light reflection film can be used as a reflection electrode, by placing other electrodes, for example, transparent electrodes 154, the effect of the reflection film composed of a plurality of convex portions or concave portions can be precluded while light absorption is prevented.

Furthermore, it is also preferable to constitute the color filter with three color elements composed of YMC (yellow, magenta, and cyan) instead of the color filter made of three color elements composed of RGB (red, green, and blue). As described above, the color filter made of three color elements of YMC has excellent light transmission characteristic, and, for example, when used for a reflective liquid crystal display device, a brighter display can be achieved.

Third Embodiment

The third embodiment is a manufacturing method for forming a light reflection film on a base material including a plurality of dot regions, provided with a step of coating the base material with a photosensitive material, a step of exposing the photosensitive material, a step of forming concavities and convexities on the photosensitive material exposed, and a step of forming a light reflection film on the concavities and convexities. A pattern of the concavities and convexities is formed in units of a plurality of dots fewer than the number of the dot regions and has an irregular arrangement in each of the units.

That is, the manufacturing method for the substrate with light reflection film includes a step for forming a first base material including a plurality of convex portions or concave portions having substantially the same height, which are arranged in the direction of the plane on a random basis and which are independent of each other, by the exposure process with respect to the photosensitive resin applied by coating through the use of a mask in which light transmission portions or light non-transmission portions have the two-dimensional shapes of independent circles and polygons, or of either of them, and are arranged in the direction of the plane on a random basis, a step of forming a second base material including continuous plural convex portions or concave portions by coating the surface of the first base material with the photosensitive resin and performing the exposure process, and a step of forming a reflection layer on the surface of the second base material.

Figure 11:
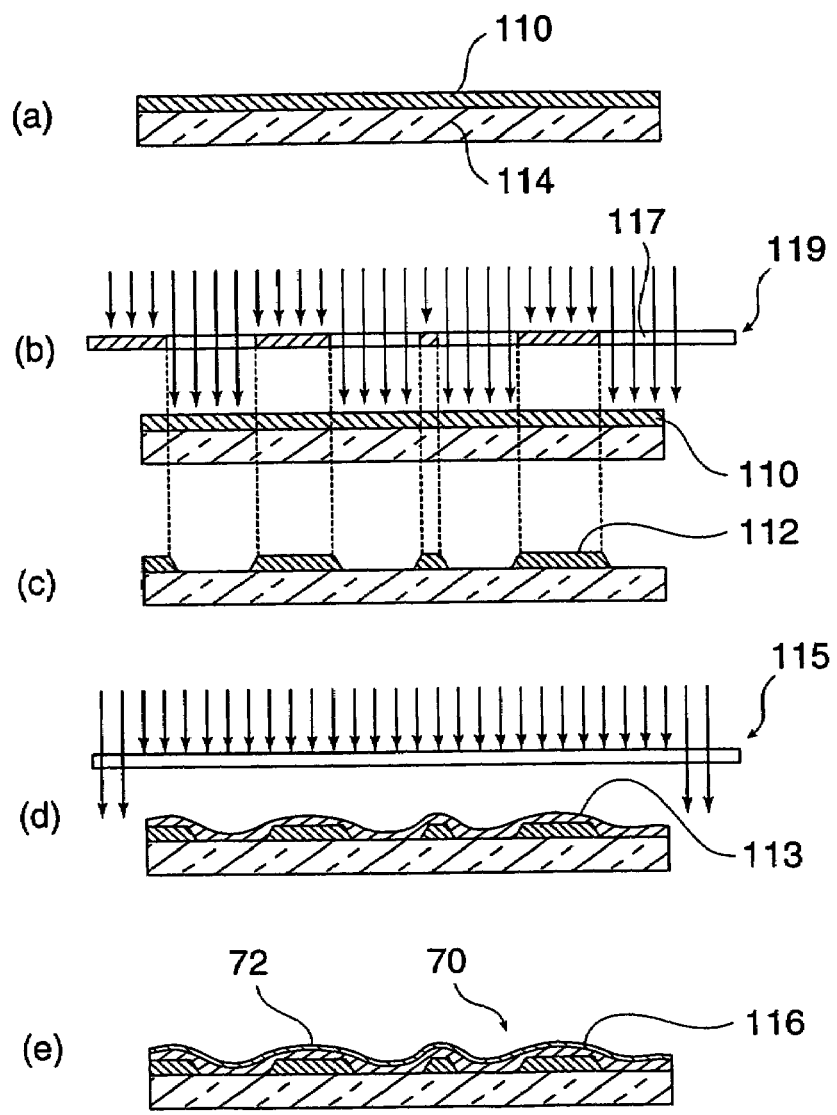
FIG. 11 is a manufacturing process diagram of a substrate with light reflection film.
Figure 12:
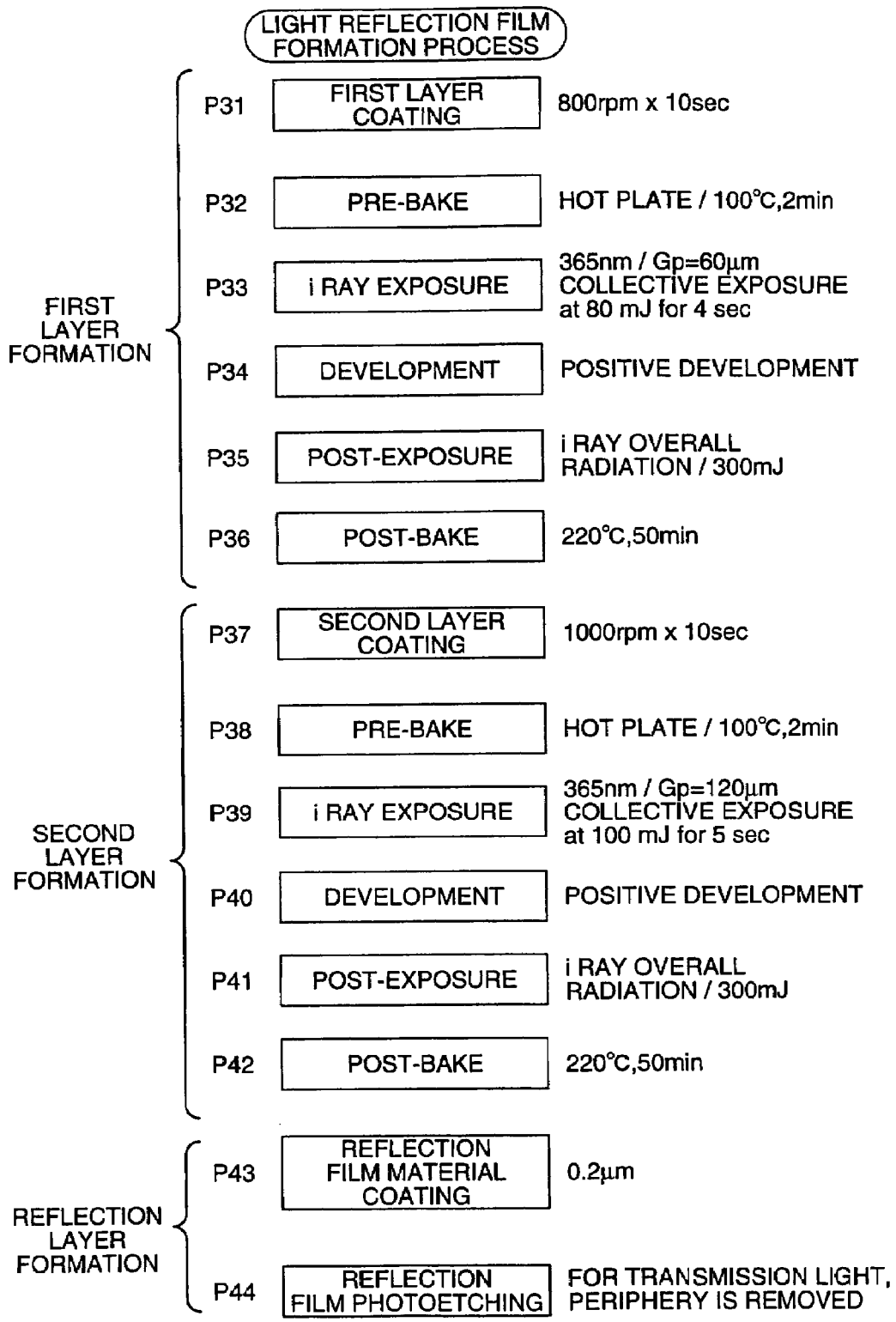
FIG. 12 is a flow chart of manufacturing process of a substrate with light reflection film.

The manufacturing method for the substrate with light reflection film will be specifically described below using, as an example, the case where the concave portions are formed on the surface of the first base material with reference to FIG. 11 and FIG. 12 as appropriate. FIG. 11 is a schematic diagram of a manufacturing process for a substrate with light reflection film, and FIG. 12 is a flow chart thereof.

1. Step of Forming the First Base Material

Preferably, a plurality of concave portions arranged in the direction of the plane on a random basis are formed from a positive type photosensitive resin by the exposure process using the mask described in the first embodiment.

That is, preferably, the plurality of concave portions arranged in the direction of the plane on a random basis are constituted from the photosensitive resin through the mask in which the light transmission portions or light non-transmission portions have the two-dimensional shapes of independent circles and polygons, or of either of them, and are arranged in the direction of the plane on a random basis.

(1) Photosensitive Resin

The sort of the photosensitive resin constituting the first base material is not specifically limited. Examples thereof include, for example, acryl-based resins, epoxy-based resins, silicone-based resins, phenol-based resins, and oxetane-based resins, alone or in combination of at least two thereof.

Furthermore, it is also preferable to add an inorganic filler, for example, silica particles, titanium oxide, zirconium oxide, and aluminum oxide, into the photosensitive resin in order that predetermined circles or polygons can be achieved with precision.

As described above, regarding the photosensitive resin constituting the first base material, although there are a positive type, in which the portion radiated with light that passed through the light transmission portion is photolyzed so as to be solubilized with respect to a developer, and a negative type, in which the portion radiated with light that passed through the light transmission portion is cured so as to be insolubilized with respect to the developer, both can be used suitably.

(2) Exposure Process

As shown in FIG. 11(a) and as shown by a step P31 in FIG. 12, when the first base materials which are a plurality of concave portions independent of each other, are formed, preferably, a support portion 114 is uniformly coated with a photosensitive resin constituting the first base materials by the use of a spin coater, etc., and, therefore, a first layer 110 is formed. In that case, the condition of the spin coater is preferably specified to be that, for example, the number of revolutions is 600 to 2,000 rpm for 5 to 20 seconds.

In order to improve resolution, as shown by a step P32 in FIG. 12, preferably, the first layer 110 is pre-baked. In that case, for example, a hot plate is used preferably while the heating condition is specified to be at 80° C. to 120° C. for 1 to 10 minutes.

As shown in FIG. 11(b) and as shown by a step P33 in FIG. 12, preferably, the mask 119 in the first embodiment is used, and exposure to i ray, etc., is preferably performed after the mask 119 in the first embodiment is placed on the first layer 110 made of the photosensitive resin uniformly applied by coating. In that case, the exposure quantity of the i ray, etc., is preferably specified to be a value within the range of 50 to 300 mJ/cm$^2$.

As shown in FIG. 11(c) and as shown by a step P34 in FIG. 12, for example, by positive development of the portion radiated with light that passed through the light transmission portion 117 of the mask 119 using a developer, the first base materials 112 composed of a plurality of concave portions, which are arranged in the direction of the plane on a random basis and which are independent of each other, can be formed.

It is also preferable that before a second base material 113 is formed, as shown by steps P35 and P36 in FIG. 12, for example, post-exposure is performed over the surface in order that the exposure quantity becomes 300 mJ/cm$^2$ and, thereafter, post-bake is performed by heating under the condition of 220° C. for 50 minutes in order that the first base material 112 is further strengthened.

2. Step of Forming the Second Base Material

A step of forming the second base material is the step of forming the second base material as a continuous layer on the first base material, that is, on the plurality of concave portions arranged in the direction of the plane on a random basis by resin coating, etc.

(1) Photosensitive Resin

The sort of the photosensitive resin constituting the second base material is not specifically limited. Examples thereof include, for example, acryl-based resins, epoxy-based resins, silicone-based resins, and phenol-based resins.

A photosensitive resin constituting the second base material and a photosensitive resin constituting the first base material are preferably made to be of the same sort because adhesion between the first base material and the second base material is improved.

Preferably, the surface of the first base material is subjected to a treatment with a silane coupling agent, etc., in advance because adhesion between the first base material and the second base material is improved.

(2) Step of Exposing

As shown in FIG. 11(d) and as shown by steps P37 to P40 in FIG. 12, when the second base material 113 is formed, preferably, after the photosensitive resin constituting the second base material 113 is applied by coating, a mounting region in the periphery of the panel display region is exposed to i ray, etc., and, therefore, the resin layer is removed. In this case, it is also preferable that the exposure quantity of the i ray, etc., is specified to be a value within the range of, for example, 50 to 300 mJ/cm$^2$ in a manner similar to that in the exposure of the first base material 112.

Furthermore, it is also preferable that, as shown by steps P41 to P42 in FIG. 12, after the second base material 113 is formed, for example, post-exposure is performed over the surface in order that the exposure quantity becomes 300 mJ/cm$^2$ and, subsequently, post-bake is performed by heating under the condition of 220° C. for 50 minutes in order that each of the first base material 112 and the second base material 113 is further strengthened.

3. Step of Forming Reflection Layer

As shown in FIG. 11(*e*) and as shown by steps P43 to P44 in FIG. 12, a step of forming the reflection layer is the step of forming the reflection layer 116 having a smooth curved surface on the surface of the second base material 113 in order to scatter the light moderately.

(1) Reflection Layer Material

As is described in the second embodiment, the material for the reflection layer is preferably specified to be a metal material having excellent light reflection property, for example, aluminum (Al) and silver (Ag).

(2) Forming Method

The reflection layer is preferably formed using a method, for example, sputtering. The reflection layer material other than a desired portion can be removed by a method, for example, photoetching.

Since the surface of the second base material includes concavities and convexities, the reflection layer material may not be laminated at a uniform thickness. At that time, preferably, a rotational evaporation method or rotational sputtering method is adopted.

Preferably, the reflection layer is formed and, in addition, the reflection layer is electrically connected to a terminal, for example, a TFT (Thin Film Transistor) and a MIM (Metal Insulating Metal).

Fourth Embodiment

The fourth embodiment is a liquid crystal display device of an active matrix system using a TFD (Thin Film Diode), which is a two-terminal type active element, as an active element, and is provided with a liquid crystal element held between substrates and a substrate with light reflection film placed on the substrate on the side opposite to the observation side of the liquid crystal element. The substrate with light reflection film is composed of a base material and a reflection layer, the heights of a plurality of convex portions or the depths of a plurality of concave portions, which are formed on the base material, are specified to be substantially the same, the two-dimensional shapes of the plurality of convex portions or concave portions are specified to be the two-dimensional shapes of independent circles and polygons, or of either of them, and, in addition, the plurality of convex portions or concave portions are arranged in the direction of the plane on a random basis.

The specific description will be made below with reference to FIG. 23 to FIG. 25. A transflective liquid crystal display device having a system capable of selectively performing reflective display using external light and transmissive display using an illumination device will be described as an example.

Figure 23:
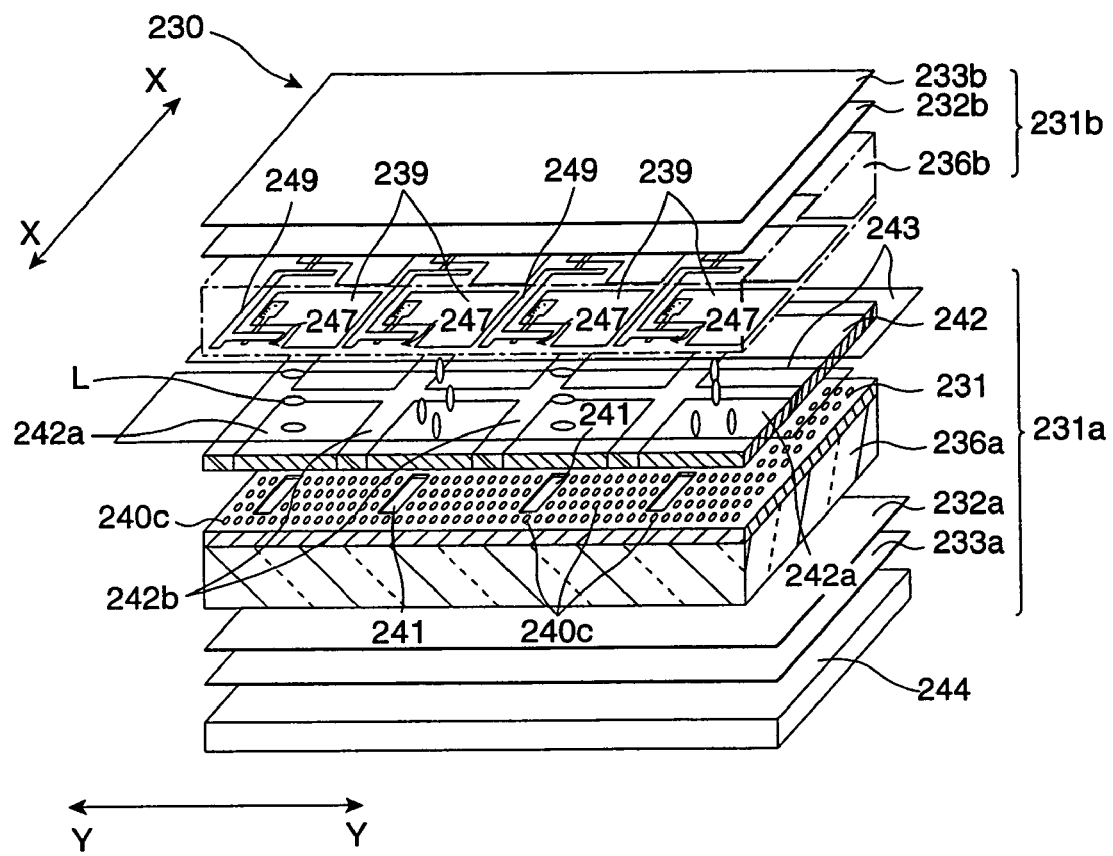
FIG. 23 is an exploded view of a liquid crystal display device of a TFD system.

In the present embodiment as well, as shown in FIG. 23, a liquid crystal device 230 is formed by attaching a first substrate 231*a* and a second substrate 231*b* with a seal member (not shown in the drawing), and encapsulating a liquid crystal in a gap surrounded by the first substrate 231*a*, second substrate 231*b*, and the seal member, that is, a cell gap. Preferably, an IC for driving the liquid crystal (not shown in the drawing) has been directly mounted on the surface of one substrate 231*b* by, for example, a COG (Chip on glass) system.

Figure 24:
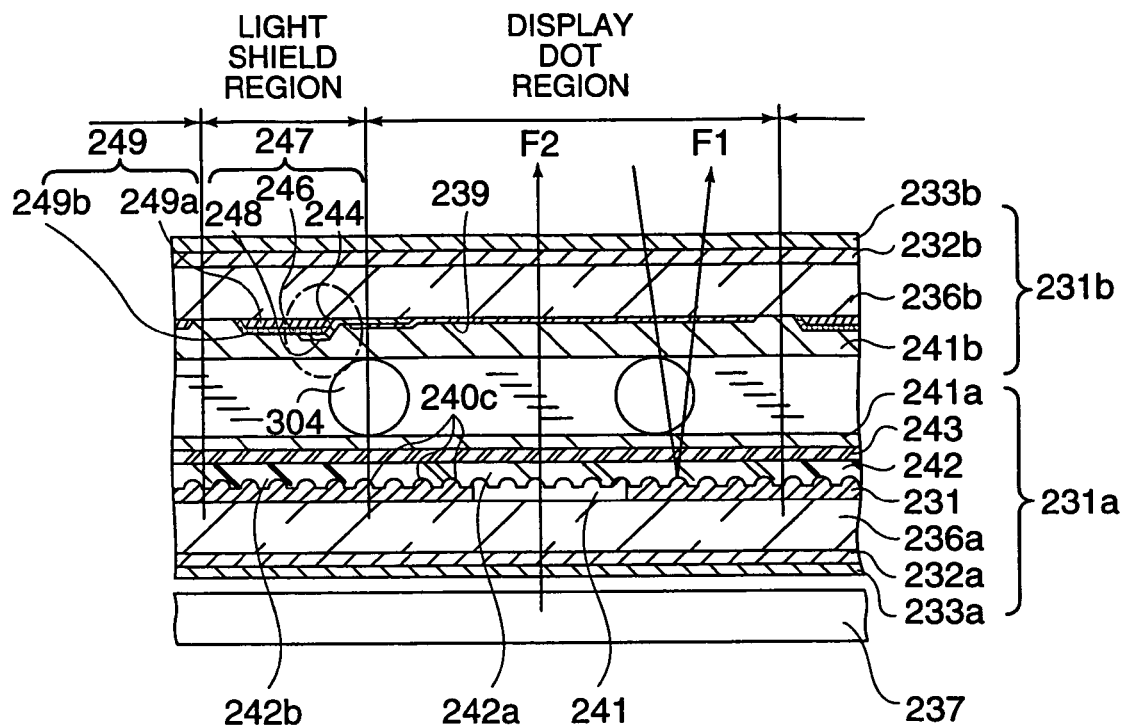
FIG. 24 is a partial sectional view of a liquid crystal display device of a TFD system.
Figure 25:
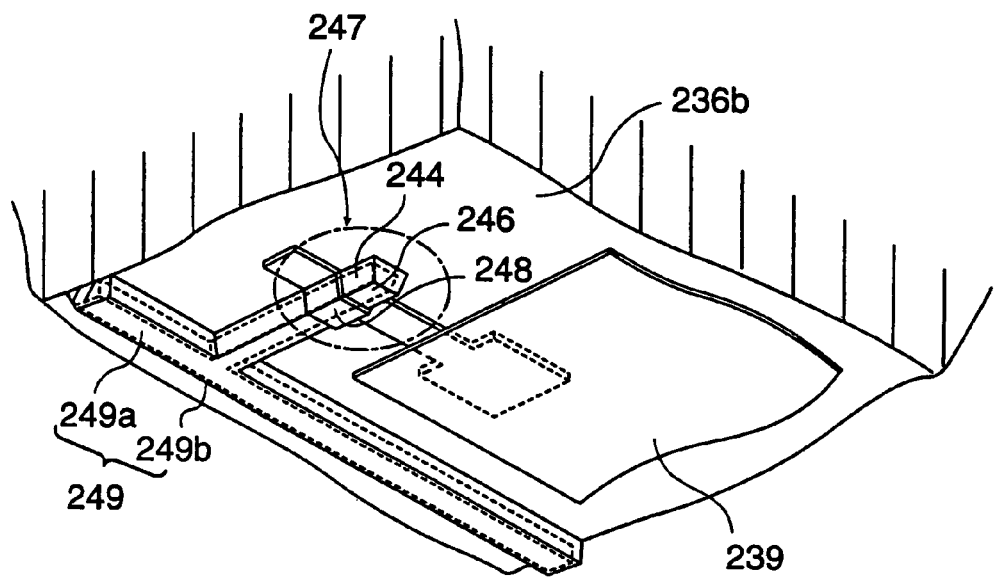
FIG. 25 is a partial perspective view of a liquid crystal display device of a TFD system.
Figure 26:
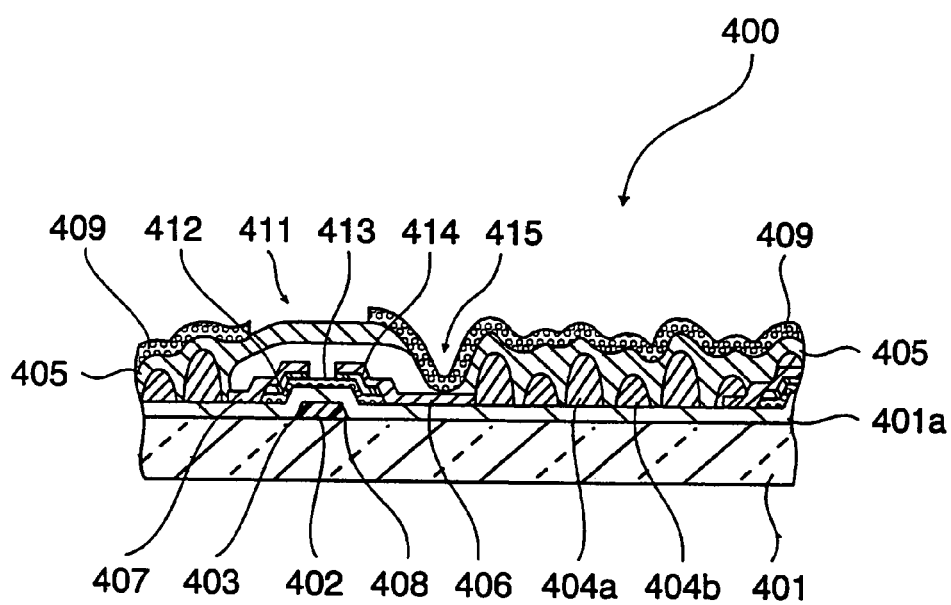
FIG. 26 is a sectional view showing a configuration of a conventional liquid crystal display device.
Figure 27:
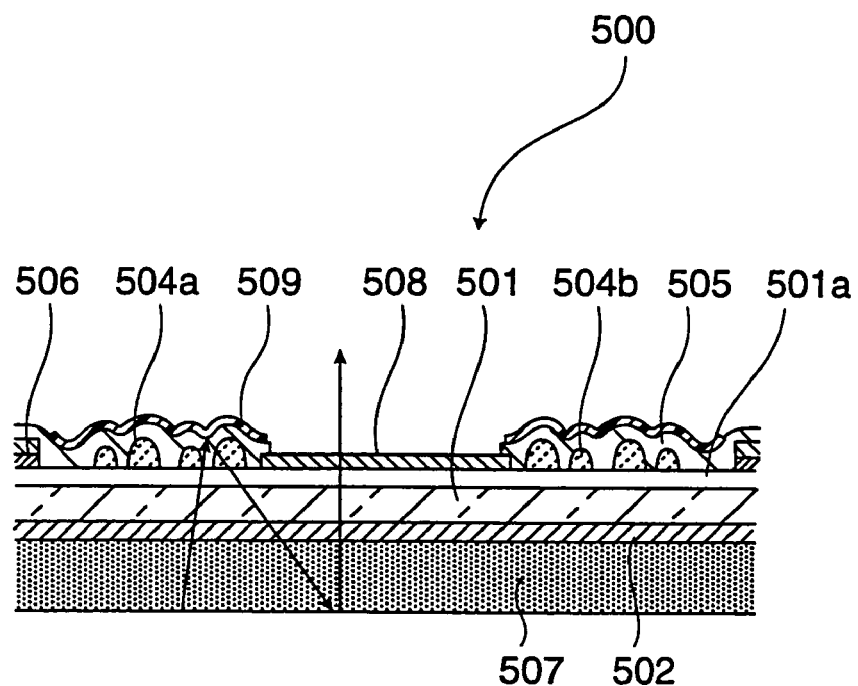
FIG. 27 is a sectional view showing another configuration of a conventional liquid crystal display device.
Figure 28:
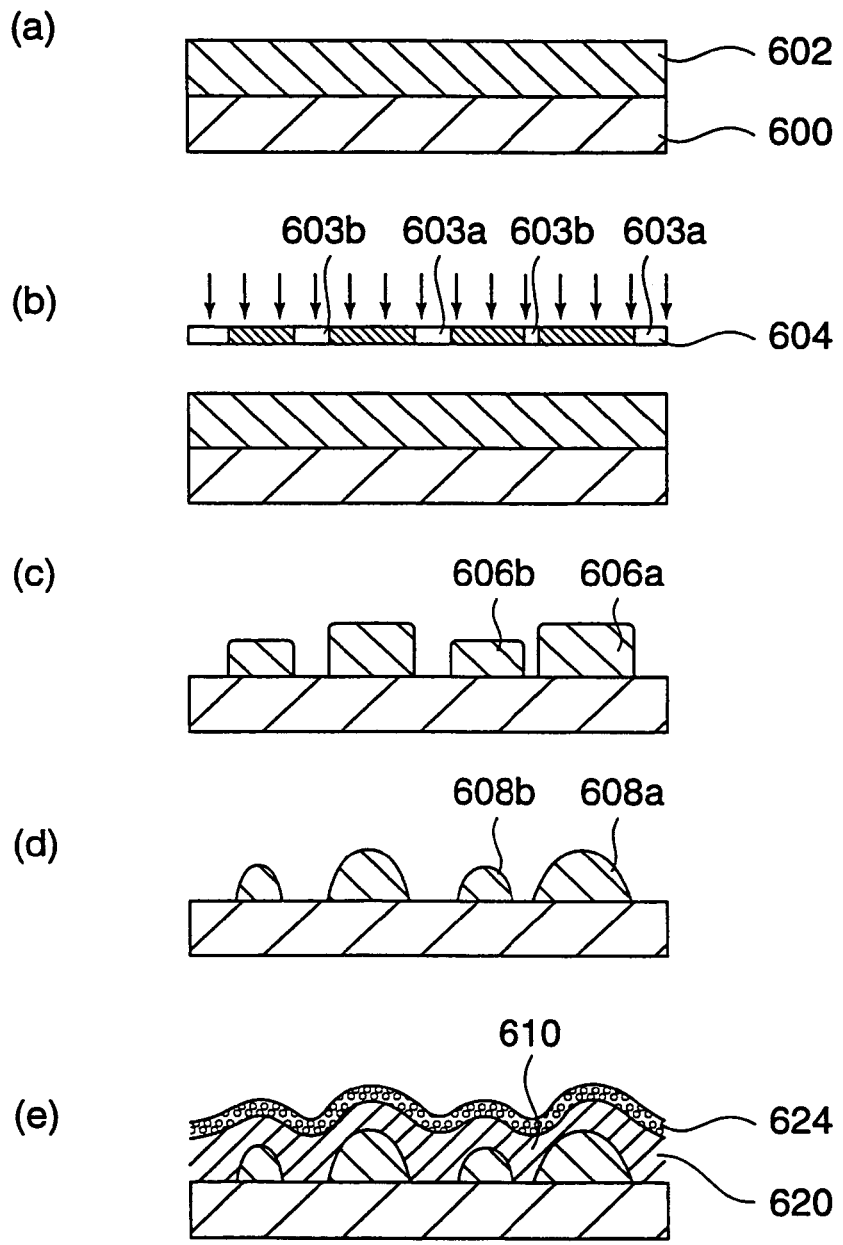
FIG. 28 is a manufacturing process diagram of a conventional liquid crystal display device.

In FIG. 23, among a plurality of display dots constituting the display region of the liquid crystal device 230, cross-sectional structures of several display dots are shown under magnification, and FIG. 24 shows a cross-sectional structure of one display dot portion.

Herein, as shown in FIG. 23, in the internal region of the second substrate 231*b* surrounded by the seal member, a plurality of pixel electrodes are formed in a dot matrix-shaped arrangement relative to the row direction XX and the column direction YY. In the internal region of the first substrate 231*a* surrounded by the seal member, stripe-shaped electrodes are formed, and the stripe-shaped electrodes are placed facing the plurality of pixel electrodes on the second substrate 231*b* side.

A portion where the liquid crystal is held between the stripe-shaped electrode on the first substrate 231*a* and one pixel electrode on the second substrate 231*b* forms one display dot, and a plurality of display dots are arranged in the shape of a dot matrix in the internal region surrounded by the seal member and, therefore, the display region is formed. The IC for driving the liquid crystal controls orientation of the liquid crystal on a display dot basis by selectively applying scanning signals and data signals between the counter electrodes in the plurality of display dots. That is, by controlling orientation of the liquid crystal, light that passes through the liquid crystal is modulated and, therefore, images, for example, letters and figures, are displayed in the display region.

In FIG. 24, the first substrate 231*a* includes a base material 236*a* formed from glass, plastic, etc., a light reflection film 231 formed on the inner surface of the base material 236*a*, a color filter 242 formed on the light reflection film 231, and transparent stripe-shaped electrodes 243 formed on the color filter 242. An orientation film 241*a* is formed on the stripe-shaped electrode 243. A rubbing treatment as an orientation treatment is performed with respect to this orientation film 241*a*. The stripe-shaped electrode 243 is formed from a transparent conductive material, for example, ITO (Indium Tin Oxide).

The second substrate 231*b* facing the first substrate 231*a* includes a base material 236*b* formed from glass, plastic, etc., TFDs (Thin Film Diodes) 247 as an active element which functions as a switching element formed on the inner surface of the base material 236*b*, and pixel electrodes 239 connected to these TFDs 247. An orientation film 241*b* is formed on the TFDs 247 and the pixel electrodes 239, and a rubbing treatment as an orientation treatment is performed with respect to this orientation film 241*b*. The pixel electrode 239 is formed from a transparent conductive material, for example, ITO (Indium Tin Oxide).

Preferably, the color filter 242 belonging to the first substrate 231*a* includes a color filter element 242*a* of any one of colors of R (red), G (green), and B (blue), Y (yellow), M (magenta), and C (cyan), or the like at the position facing the pixel electrode 239 on the second substrate 231*b* side, and includes a black mask 242*b* at the position not facing the pixel electrode 239.

As shown in FIG. 24, the dimension of an interval between the first substrate 231*a* and the second substrate 231*b*, that is, a cell gap, is maintained by spherical spacers 304 dispersed on the surface of any one of the substrates, and the liquid crystal is encapsulated in the cell gap.

Herein, as shown in FIG. 24, the TFD 247 is composed of a first metal layer 244, an insulation layer 246 formed on the first metal layer 244, and a second metal layer 248 formed on the insulation layer 246. As described above, the TFD 247 is configured from a laminated structure composed of the first metal layer/the insulation layer/the second metal layer, so-called MIM (Metal Insulator Metal) structure.

The first metal layer 244 is formed from, for example, tantalum alone, tantalum alloy, etc. When the tantalum alloy is used as the first metal layer 244, for example, an element belonging to groups 6 to 8 in the periodic table, e.g., tungsten, chromium, molybdenum, rhenium, yttrium, lanthanum, and dysprosium, is added to tantalum that is the primary component.

The first metal layer 244 is integrally formed with a first layer 249a of a line wiring 249. This line wiring 249 is formed in the shape of a stripe interposing the pixel electrode 239 and functions as a scanning line for supplying scanning signals to the pixel electrode 239 or a data line for supplying data signals to the pixel electrode 239.

The insulation layer 246 is made of tantalum oxide ($Ta_2O_5$) formed by, for example, oxidizing the surface of the first metal layer 244 by an anodic oxidation process. When the first metal layer 244 is anodized, the surface of the first layer 249a of the line wiring 249 is also oxidized at the same time and, therefore, a second layer 249b likewise made of tantalum oxide is formed.

The second metal layer 248 is formed from a conductive material, for example, Cr. The pixel electrode 239 is formed on the surface of the base material 236b while a part thereof overlaps the tip of the second metal layer 248. A undercoat layer may be formed from tantalum oxide, etc., on the surface of the base material 236b before the first metal layer 244 and the first layer 249a of the line wiring are formed. This is performed in order that the first metal layer 244 is prevented from peeling off from the undercoat layer due to a heat treatment after deposition of the second metal layer 248, or impurities are prevented from diffusing into the first metal layer 244.

The light reflection film 231 formed on the first substrate 231a is formed from a metal having light reflection property, for example, aluminum, and an opening 241 for passing through light is formed at the position corresponding to each pixel electrode 239 belonging to the second substrate 231b, that is, the position corresponding to each display dot. Preferably, on the surface on the liquid crystal side of the light reflection film 231, for example, crest portions or trough portions 80, 84, 180, 190, 200, 210, and 220 in the shape of an ellipse and in the shape of a dome, as shown in FIG. 8 or FIGS. 18 to 22, are formed. That is, preferably, these crest portions or trough portions 80, 84, 180, 190, 200, 210, and 220 are arranged while the X axis direction, which is the direction of extension of the line wiring, is made to be a major axis, and the Y axis direction perpendicular thereto is made to be a minor axis. The major axis direction X of the crest portions or trough portions 80, 84, 180, 190, 200, 210, and 220 is set to be parallel to the side edge extending in the XX direction of the base material, and the minor axis direction Y is set to be parallel to the side edge extending in the YY direction of the base material.

Since the liquid crystal display device 230 in the fourth embodiment is configured as described above, when the liquid crystal display device 230 performs reflective display, in FIG. 23, the external light that entered into the liquid crystal display device 230 from the observer side, that is, the second substrate 231b side, reaches the light reflection film 231 through the liquid crystal, is reflected at the light reflection film 231, and is supplied again to the liquid crystal (refer to an arrow F1 in FIG. 24). The orientation of the liquid crystal is controlled on a display dot basis by the voltage applied between the pixel electrode 239 and the stripe-shaped counter electrode 243, that is, a scanning signal and a data signal. Consequently, the reflected light supplied to the liquid crystal is modulated on a display dot basis and, therefore, images, for example, letters and figures, are displayed on the observer side.

On the other hand, when the liquid crystal display device 230 performs transmissive display, an illumination device (not shown in the drawing) placed outside the first substrate 231a, so-called backlight, emits light, and this emitted light is supplied to the liquid crystal after passing through a polarizing plate 233a, a phase difference plate 232a, the base material 236a, the opening 241 of the light reflection film 231, the color filter 242, the electrode 243, and the orientation film 241a (refer to an arrow F2 in FIG. 24). Subsequently, display is performed in a manner similar to that in the reflective display.

In the fourth embodiment, since a plurality of convex portions or concave portions are placed on the base material in the substrate with light reflection film, and the heights of the plurality of convex portions or concave portions are not varied substantially while the arrangement is performed in the direction of the plane on a random basis, occurrence of interference fringes can be reduced.

In the fourth embodiment, as described above, when the three-dimensional shape along the X axis and the three-dimensional shape along the Y axis are differentiated from each other in the plurality of convex portions or concave portions, the quantity of the reflection light toward a specified viewing angle direction is controlled to be low, and the quantity of the reflection light toward another specified viewing angle direction can be increased. As a result, in the reflective display performed using the light reflection film, the observer can observe an image displayed in the display region of the liquid crystal display device as remarkably bright display with respect to a specified viewing angle direction.

Fifth Embodiment

The fifth embodiment is a liquid crystal display device relating to a reflective liquid crystal display device of a passive matrix system, and provided with a liquid crystal element held between substrates and a substrate with light reflection film placed on the substrate on the side opposite to the observation side of the liquid crystal element. The substrate with light reflection film is composed of a base material and a reflection layer, the heights of a plurality of convex portions or the depths of a plurality of concave portions, which are formed on the base material, are specified to be substantially the same, the two-dimensional shapes of the plurality of convex portions or concave portions are specified to be the two-dimensional shapes of independent circles and polygons, or of either of them and, in addition, the plurality of convex portions or concave portions are arranged in the direction of the plane on a random basis.

The reflective liquid crystal display device of a passive matrix system in the fifth embodiment will be specifically described below with reference to FIG. 14 as appropriate. Regarding each drawing described below, the scale may be varied with respect to each layer or each member in order that each layer or each member has the size capable of being identified in the drawing.

1. Configuration

As shown in FIG. 14, this liquid crystal display device 140 has a configuration in which a first substrate 141 and a second substrate 142 facing each other are attached with a seal member 158 therebetween, and a liquid crystal 144 is encapsulated between both substrates. Furthermore, a protection plate 145 having light-transmitting property is placed on the observation side of this liquid crystal display device 140. This protection plate 145 is a plate-shaped member for protecting the liquid crystal display device 140 from shock, etc., applied from the outside, and is placed, for example, in a cabinet of an electronic apparatus on which the liquid crystal display device 140 is mounted. The protection plate 145 is placed in order to become close to the substrate surface of the first substrate 141 (the substrate on observation side) in the liquid crystal display device 140. In the fifth embodiment, the case where the protection plate 145 made of plastic is contacted with the surface of the polarizing plate 146 located at the position nearest to the observation side among the constituents of the first substrate 141 is assumed. When the protection plate 145 is configured from plastic, although there are advantages in that molding is performed with ease and manufacture can be performed inexpensively, fine concavities and convexities are likely to form.

On the other hand, the first substrate 141 and the second substrate 142 of the liquid crystal display device 140 are plate-shaped members having light-transmitting property, for example, glass, quartz, and plastic. Among these, a plurality of transparent electrodes 143 extending in the predetermined direction are formed on the inner (on the liquid crystal 144 side) surface of the first substrate 141 located on the observation side. Each transparent electrode 143 is a band-shaped electrode formed from a transparent conductive material, for example, ITO (Indium Tin Oxide). Furthermore, the surface of the first substrate 141, on which these transparent electrodes 143 are formed, is covered with an orientation film (not shown in the drawing). This orientation film is an organic thin film of polyimide, etc., and has been subjected to a rubbing treatment in order to regulate the orientation direction of the liquid crystal 144 when the voltage is not applied.

2. Light Scattering Film

The polarizing plate 146 for polarizing the incident light to the predetermined direction and a scattering layer 147 interposing between the first substrate 141 and the polarizing plate 146 are placed outside (on the side opposite to the liquid crystal 144) the first substrate 141. The scattering layer 147 is the layer for scattering light that passes through the scattering layer 147, and includes an adhesive 148a for attaching the polarizing plate 146 to the first substrate 141 and many fine particles 148b dispersed in the adhesive 148a. As this scattering layer 147, for example, the one in which fine particles 148b made of silica are dispersed in an adhesive 148a of acryl-based, epoxy-based or the like, can be used. The refractive index of the adhesive 148a and the refractive index of the fine particles 148b are different and, therefore, the light incident upon the scattering layer 147 is refracted at the boundary between the adhesive 148a and the fine particles 148b. As a result, the light incident upon the scattering layer 147 can be emitted in the condition of being scattered moderately.

Regarding the scattering layer 147 in the fifth embodiment, in order that the haze value H thereof becomes a value within the range of 10% to 60%, the number of the fine particles 148b to be dispersed in the adhesive 148a and refractive indices of both, etc., are selected. Herein, the haze value H is the value representing the degree of scattering of the light which is incident upon a member and passes through the member, and is defined by the following formula.

haze value $H=(Td/Tt) \times 100 (\%)$

Wherein, Tt denotes a total light transmittance (%), and Td denotes a scattered-light transmittance (%). The total light transmittance Tt is the value representing the ratio of the quantity of light that passed through the sample targeted for the measurement of the haze value relative to the quantity of light incident upon the sample. On the other hand, when a sample is radiated with light from a predetermined direction, the scattered-light transmittance Td is the value representing the quantity of light emitted in the direction other than the aforementioned predetermined direction relative to the quantity of light that passed through the sample, that is, the ratio of the scattered-light quantity. That is, when the ratio of the emitted-light quantity in the direction parallel to the incident light relative to the quantity of light emitted from the sample is indicated by a parallel-light transmittance Tp (%), the aforementioned scattered-light transmittance Td is represented by the difference ($Td=Tt-Tp$) between the aforementioned total light transmittance Tt and the parallel-light transmittance Tp. As is also clear from above description, it can be said that when the haze value H is increased, degree of scattering is increased, that is, the ratio of the scattered-light quantity relative to the transmitted-light quantity is increased and, conversely, the haze value H is reduced, degree of scattering is reduced, that is, the ratio of the scattered-light quantity relative to the transmitted-light quantity is reduced.

The aforementioned haze value H is described in detail in JIS (Japanese Industrial Standards) K6714-1977.

3. Reflection Layer (Light Reflection Layer)

On the other hand, a reflection layer 149 is formed on the inner (on the liquid crystal 144 side) surface of the second substrate 142. This reflection layer 149 is the layer for reflecting the light incident from the observation side upon the liquid crystal display device 140, and is formed from a metal having light reflecting property, for example, aluminum and silver.

Herein, as shown in FIG. 14, the region covered with the reflection layer 149 in the inner surface of the second substrate 142 is a roughened surface on which many fine protrusions and dents are formed. More specifically, the reflection layer 149 is the substrate with light reflection film including the base material and the reflection layer, wherein the heights of the plurality of convex portions and the depths of the concave portions, which are formed on the surface of the base material while being independent of each other, are specified to be substantially the same, the two-dimensional shapes of the plurality of convex portions or concave portions are specified to be the two-dimensional shapes of independent circles and polygons, or of either of them and, in addition, the plurality of convex portions or concave portions are arranged in the direction of the plane on a random basis.

Consequently, the surface of the reflection layer 149 becomes a roughened surface in which protrusions and dents on the second substrate 142 surface are incorporated. That is, the reflection layer 149 has a scattering structure for realizing a wide viewing angle by moderately scattering the reflected light on the surface thereof. More specifically, regarding the structure, the reflection layer 149 is formed on the base material composed of the plurality of convex portions or concave portions, the heights of the plurality of convex portions formed on the base material are specified to be substantially the same, the two-dimensional shapes of the plurality of convex portions or concave portions are specified to be the two-dimensional shapes of independent circles and polygons, or of either of them and, in addition, the plurality of convex portions or concave portions are arranged in the direction of the plane on a random basis.

4. Other Configuration

Furthermore, on the surface of the reflection layer 149 covering the second substrate 142, color filters 150, a light-shielding layer 151, an overcoat layer 157 for flattening the concavities and convexities formed by the color filters 150 and the light-shielding layer 151, a plurality of transparent electrodes 154, and an orientation film (not shown in the drawing) are formed.

Each transparent electrode 154 is a band-shaped electrode extending in the direction (the right-and-left direction on the paper surface in FIG. 14) intersecting the extension direction of the transparent electrode 143 on the first substrate 141, and is formed from a transparent conductive material, for example, ITO (Indium Tin Oxide), in a manner similar to that in the transparent electrode 143.

Under such a configuration, the orientation direction of the liquid crystal 144 varies depending on the voltage applied between the transparent electrode 143 and the transparent electrode 154. That is, the regions where the transparent electrode 143 and the transparent electrode 154 intersect function as pixels (sub-pixels). The color filter 150 is resin layer placed corresponding to each of these pixels, and is colored in any one of R, G, and B with a dye or pigment.

The light-shielding layer 151 is a grid-shaped layer for shielding the gap portions among the pixels from light, and is formed from, for example, a black resin material in which carbon black is dispersed.

5. Action

The reflective display is realized by the aforementioned configuration. That is, external light, for example, sunlight and room illumination light, is incident upon the liquid crystal display device 140 through the protection plate 145, and is reflected at the surface of the reflection layer 149.

This reflected light passes through the liquid crystal 144 and the first substrate 141, is moderately scattered at the scattering layer 147, passes through the polarizing plate 146 and, thereafter, is emitted to the observation side of the liquid crystal display device 140. The light emitted from the liquid crystal display device 140 passes through the protection plate 145, and is visually identified by the observer.

Herein, as described above, when plastic is used as the material for the protection plate 145, it is difficult to make the surface thereof a perfect plane and, therefore, a plurality of fine concavities and convexities are likely to form. When the protection plate 145, on which the aforementioned fine concavities and convexities are formed, is placed in order to become close to the first substrate 141 of the liquid crystal display device 140, the light emitted from the liquid crystal display device 140 brings about interference during passing through the protection plate 145, and as a result, interference fringes corresponding to the concavities and convexities overlap with a display image and, therefore, degradation of display quality may be brought about.

However, according to the result of experiments performed by the present inventors, as shown in the aforementioned embodiment, it was found out that when the light which reaches the protection plate 145 through the liquid crystal 144 is scattered by the scattering layer 147, high quality display can be realized.

Regarding the configuration shown in FIG. 14, from the viewpoint of preventing occurrence of interference fringes, it is desirable that the haze value H of the scattering layer 147 is high, that is, the degree of scattering is high. However, when this haze value H is made to be an excessively high value (for example, a value of 70% or more), the light reaching the protection plate 145 from the liquid crystal display device 140 is excessively scattered and, therefore, a new problem may occur in that the contrast of the display image is degraded, that is, the display image becomes blurred. On the other hand, when the haze value H of the scattering layer 147 is made to be an excessively low value, for example, is made to be a value of 10% or less, stains due to the concavities and convexities are likely to be observed.

According to the result of experiments performed by the present inventors, it was found out that when the pattern formed by the convex portions or concave portions is in an irregular arrangement in each unit defined by one dot or two dots, the haze value H of the scattering layer 147 is preferably set at a value within the range of 40% to 60% and, therefore, it is possible to avoid remarkable degradation of contrast of the display image, reduction of the display quality due to the concavities and convexities on the surface of the protection plate 145 can be prevented effectively, and excellent display quality can be ensured. When the pattern formed by the convex portions or concave portions is in an irregular arrangement in each unit defined by three dots or more, the haze value H of the scattering layer 147 is set at a value within the range of 10% to 40% and, therefore, the contrast can be set high.

When the scattering layer 147, in which fine particles 148*b* are dispersed in the adhesive 148*a* as shown in the fifth embodiment, is used, for example, the haze value H can be selected arbitrarily by adjusting the addition quantity (number) of the fine particles 148*b*.

That is, when the addition quantity of the fine particles 148*b* to be dispersed in the adhesive 148*a* is increased, the incident light upon the scattering layer 147 is further scattered, and thus the haze value H of the scattering layer 147 can be increased. Conversely, when the addition quantity of the fine particles is reduced, the haze value H of the scattering layer 147 can be reduced.

According to the fifth embodiment, there is an advantage in that the degree of scattering of the light emitted from the liquid crystal display device 140 can be selected from a wide range with ease. That is, in a liquid crystal display device not including the aforementioned scattering layer 147, in order to adjust the degree of scattering of the light emitted from the liquid crystal display device 140, it is necessary to adjust the shape of the surface of the reflection layer 149, for example, the heights of the convex portions and the depths of the concave portions, or the distances between adjacent convex portions (or concave portions), etc.

However, it is not always easy to make the surface of the reflection layer 149 have a desired shape with precision in view of the circumstances of manufacturing technique for forming desired concavities and convexities on the second substrate 142. Furthermore, when only adjustment of the shape of the reflection layer 149 surface is performed, the width, in which the degree of scattering of the light emitted from the liquid crystal display device 140 can be adjusted, is limited to a very small range.

On the other hand, according to the present embodiment, there is an advantage in that the degree of scattering of the light emitted from the liquid crystal display device 140 can be easily adjusted over a wide range by changing the haze value H of the scattering layer 147, for example, by appropriately adjusting the addition quantity of the fine particles 148b dispersed in the adhesive 148a, and the like, without significant change of the shape of the surface of the reflection layer 149.

Sixth Embodiment

The sixth embodiment is a liquid crystal display device provided with a liquid crystal element held between substrates and a substrate with light reflection film placed on the substrate on the side opposite to the observation side of the liquid crystal element, and that is a transflective liquid crystal display device of a passive matrix system. The substrate with light reflection film is composed of a base material and a reflection layer, the heights of a plurality of convex portions or the depths of a plurality of concave portions, which are formed on the base material, are specified to be substantially the same, the two-dimensional shapes of the plurality of convex portions or concave portions are specified to be the two-dimensional shapes of independent circles and polygons, or of either of them and, in addition, the plurality of convex portions or concave portions are arranged in the direction of the plane on a random basis.

The transflective liquid crystal display device of a passive matrix system in the sixth embodiment will be specifically described with reference to FIG. 15.

1. Basic Configuration

As shown in FIG. 15, in the sixth embodiment, a backlight unit 153 is placed on the back side (the side opposite to the observation side) of a liquid crystal display device 160. This backlight unit 153 includes a plurality of LEDs 15 (only one LED 15 is shown in FIG. 15) function as light sources, a light guide plate 152 guiding the light incident upon the side end surface from the LEDs 15 to over the surface of the second substrate 142 in the liquid crystal display device 160, a diffusion plate 155 for uniformly diffusing the light guided by this light guide plate 152 relative to the liquid crystal display device 160, and a reflection plate 156 for reflecting the light emitted from the light guide plate 152 to the side opposite to the liquid crystal display device 160 to the liquid crystal display device 160 side.

Herein, the LEDs 15 are not always lit, but are lit in response to the indication from the user or a detection signal from a sensor when used in the circumstances where little external light exists.

Furthermore, in the liquid crystal display device 160 according to the sixth embodiment, an opening portion 159 is formed on the region corresponding to the neighborhood of the center portion of each pixel in the reflection layer 149. Although another polarizing plate is attached to outside (the side opposite to the liquid crystal 144) of the second substrate 142, the polarizing plate is not shown in FIG. 15.

2. Action

According to the liquid crystal display device having such a configuration, transmissive display can be realized in addition to the reflective display shown in the aforementioned fifth embodiment. That is, the light radiated to the liquid crystal display device 160 from the backlight unit 153 passes through the opening portion 159 of the reflection layer 149. This light passes through the liquid crystal 144 and the first substrate 141, is scattered at the scattering layer 147, passes through the polarizing plate 146 and, thereafter, is emitted to the observation side of the liquid crystal display device 160. This emitted light passes through the protection plate 145 and is emitted to the observation side and, therefore, the transmissive display can be realized.

Consequently, in the present embodiment as well, in a manner similar to that in the aforementioned fifth embodiment, even when the protection plate 145, on which the fine concavities and convexities are formed on the surface, is placed in order to become close to the liquid crystal display device 160, degradation of display quality due to the concavities and convexities can be prevented.

Seventh Embodiment

The seventh embodiment is a liquid crystal display device provided with a liquid crystal element held between substrates and a substrate with light reflection film placed on the substrate on the side opposite to the observation side of the liquid crystal element, and is a modified example of the liquid crystal display device. The substrate with light reflection film is composed of a base material and a reflection layer, the heights of a plurality of convex portions or the depths of a plurality of concave portions, which are formed on the base material, are specified to be substantially the same, the two-dimensional shapes of the plurality of convex portions or concave portions are specified to be the two-dimensional shapes of independent circles and polygons, or of either of them and, in addition, the plurality of convex portions or concave portions are arranged in the direction of the plane on a random basis.

(1) MODIFIED EXAMPLE 1

In the configuration of each of the aforementioned embodiments, the scattering layer 147 is placed between the first substrate 141 and the polarizing plate 146. However, the position of the scattering layer 147 is not limited to these. For example, when a phase difference plate for compensating the interference color is placed between the polarizing plate 146 and the first substrate 141, the scattering layer 147 may be interposed between the phase difference plate and the first substrate 141, or the scattering layer 147 may be interposed between the phase difference plate and the polarizing plate 146. In short, it is essential that the scattering layer 147 be configured to be placed on the protection plate 145 side relative to the liquid crystal 144.

In each of the aforementioned embodiments, the scattering layer 147 having the configuration in which many fine particles 148b are dispersed in the adhesive 148a, is used. However, the configuration of the scattering layer 147 is not limited to these, and may be any configuration as long as the layer can scatter incident light. Furthermore, when the scattering layer 147 containing the adhesive 148a is used, since the members holding the scattering layer 147 therebetween, for example, the first substrate 141 and the polarizing plate 146 in each of the aforementioned embodiments, can be attached to each other with the adhesive 148a, there is an advantage in that reduction of manufacturing cost and simplification of manufacturing process can be achieved compared to the case where the scattering layer 147 not containing the adhesive 148a is used.

(2) MODIFIED EXAMPLE 2

The reflective liquid crystal display device is exemplified in the fifth embodiment, and the transflective liquid crystal display device is exemplified in the sixth embodiment. However, the present invention can also be applied to a transmissive liquid crystal display device which does not include the reflection layer 149 and which performs transmissive display only. That is, it is essential that the transmissive liquid crystal display device have the configuration of the transflective liquid crystal display device shown in FIG. 15 except the reflection layer 149.

In the configuration of the aforementioned fourth embodiment, both of the reflective display and the transmissive display are realized by the reflection layer 149 including the opening portions 159. However, it is needless to say that the present invention can also be applied to the transflective liquid crystal display device using a so-called half-mirror, which transmits a part of radiated light and reflects other part, instead of such a reflection layer 149.

(3) MODIFIED EXAMPLE 3

In each of the aforementioned embodiments, the case where the plastic plate-shaped member is used as the protection plate 145 is exemplified. Since concavities and convexities are likely to form on the surface of such the protection plate 145, especially remarkable effect can be exhibited by applying the present invention. However, the material for the protection plate 145 is not limited to this, and other plate-shaped members of various materials can be used as the protection plate 145.

(4) MODIFIED EXAMPLE 4

In each of the aforementioned embodiments, the case where the color filters 150 and the light-shielding layers 151 are formed on the second substrate 142 is exemplified. However, it is needless to say that the present invention can also be applied to the liquid crystal display device in which these elements are formed on the first substrate 141, and the liquid crystal display device not provided with the color filters 150 or the light-shielding layers 151. As described above, the present invention can be applied to the liquid crystal display device 160 as long as the protection plate 145 is configured to be placed close to the observation side regardless of modes of the other elements.

(5) MODIFIED EXAMPLE 5

Figure 13:
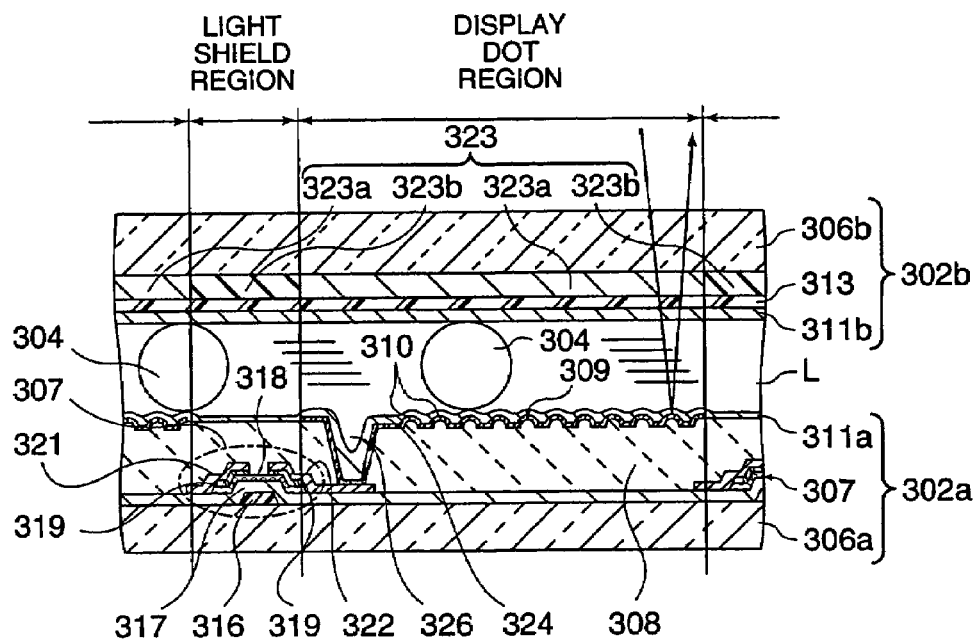
FIG. 13 is a sectional view for explaining a substrate with light reflection film electrically connected to a TFT element.

In the aforementioned fourth embodiment, the liquid crystal display device of an active matrix system using the TFD, which is a two-terminal type active element, as the active element is exemplified. However, as shown in FIG. 13, it may be a liquid crystal display device of an active matrix system using the TFT, which is a three-terminal type active element, as the active element. In this case, preferably, the TFT element is placed in the light shield region, as shown in FIG. 13.

Eighth Embodiment

The eighth embodiment is an electronic apparatus including a liquid crystal display device provided with a substrate with light reflection film. The substrate with light reflection film includes a base material and a reflection layer, the heights of a plurality of convex portions or the depths of a plurality of concave portions, which are formed on the base material, are specified to be substantially the same, the two-dimensional shapes of the plurality of convex portions or concave portions are specified to be the two-dimensional shapes of independent circles and polygons, or of either of them and, in addition, the plurality of convex portions or concave portions are arranged in the direction of the plane on a random basis.

(1) Mobile Type Computer

Figure 16:
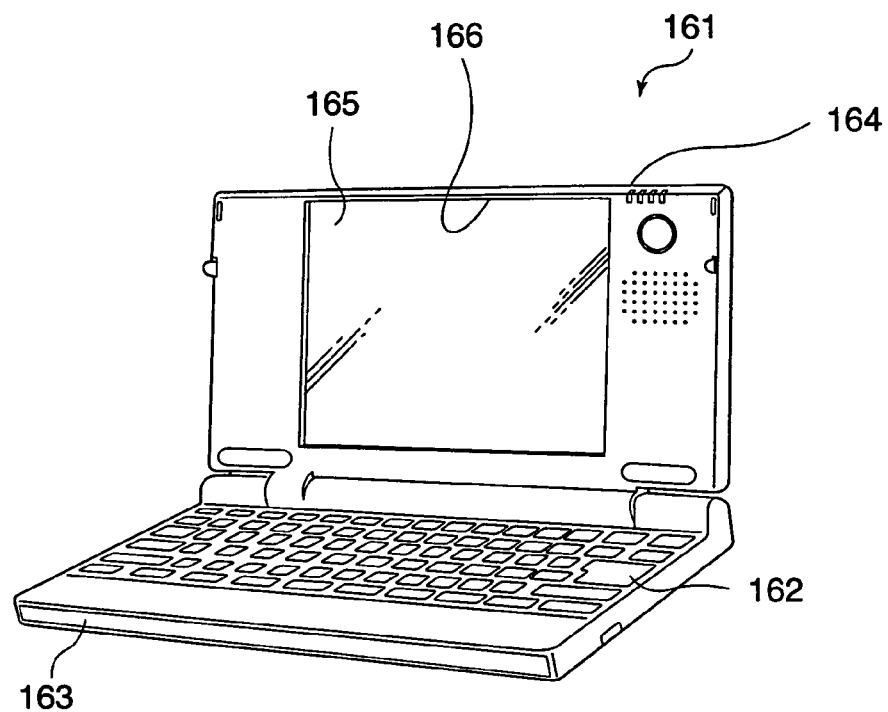
FIG. 16 is a perspective view showing the configuration of a personal computer as an example of an electronic apparatus.

An example, in which the liquid crystal display device according to the present invention is applied to the display portion of a transportable personal computer (so-called notebook personal computer), will be described. FIG. 16 is a perspective view showing the configuration of this personal computer. As shown in the aforementioned drawing, the personal computer 161 is provided with a body portion 163 including a keyboard 162, and a display portion 164 using the liquid crystal display device according to the present invention (not shown in the drawing). The display portion 164 has the configuration in which the liquid crystal display device 160 according to the present invention is stored in a cabinet 166 provided with a plastic protection plate 145 corresponding to a window portion 165. For further details, the liquid crystal display device 160 is stored in the cabinet 166 in order that the substrate surface thereof on the observation side becomes close to the protection plate 145. In such a personal computer 161, the transflective liquid crystal display device provided with the backlight unit 153 on the back side is used desirably, as shown in the aforementioned sixth embodiment, in order to ensure visibility of the display even under circumstances where external light does not exist adequately.

(2) Cellular Phone

Figure 17:
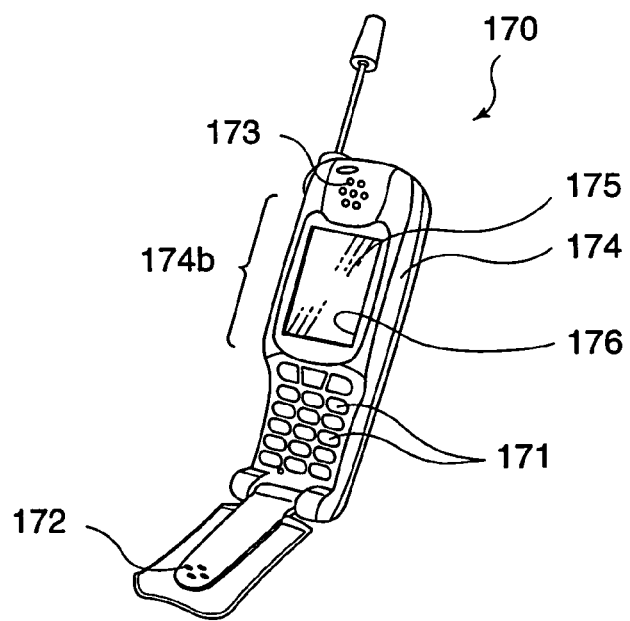
FIG. 17 is a perspective view showing the configuration of a cellular phone as an example of an electronic apparatus.
Figure 18:
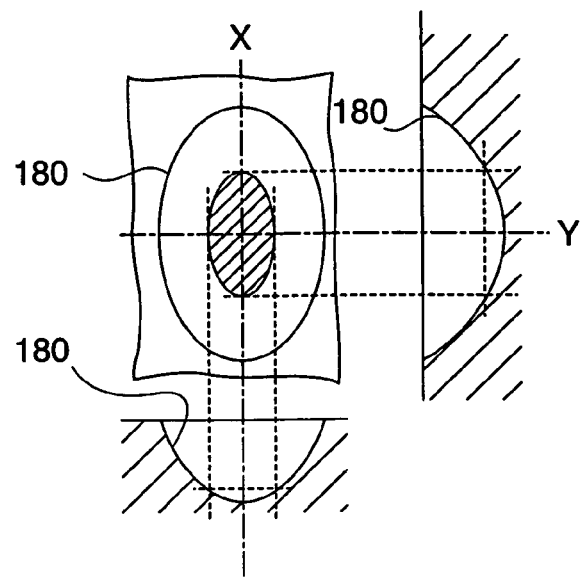
FIG. 18 is a plan view and a sectional view of a substrate with light reflection film made of a substantially cone-shaped concave portion.
Figure 19:
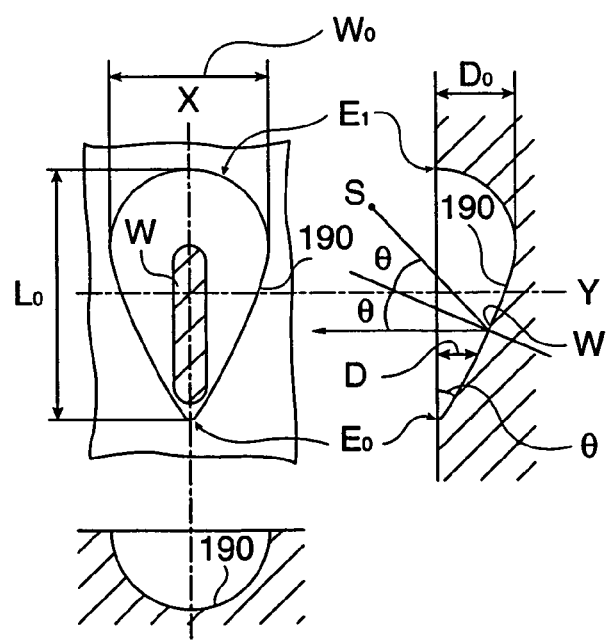
FIG. 19 is a plan view and a sectional view of a substrate with light reflection film made of an asymmetrical substantially tear-shaped concave portion.
Figure 20:
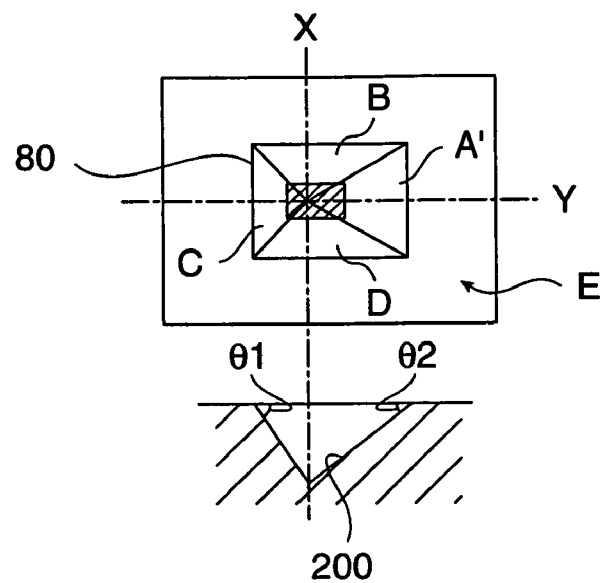
FIG. 20 is a plan view and a sectional view of a substrate with light reflection film made of an asymmetrical substantially pyramid-shaped concave portion.
Figure 21:
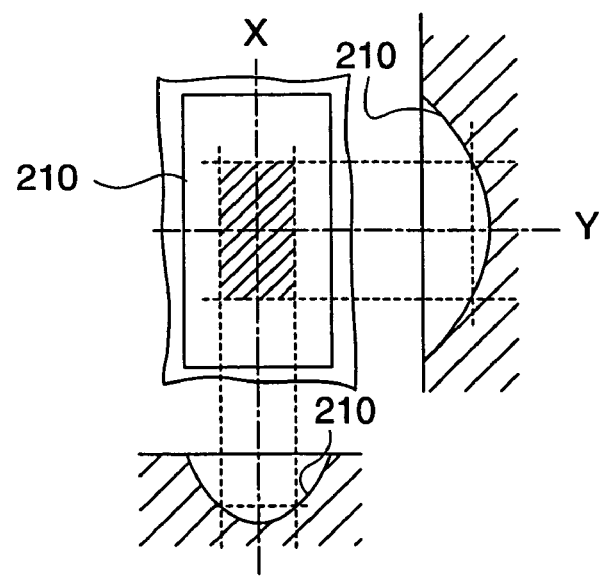
Figure 22:
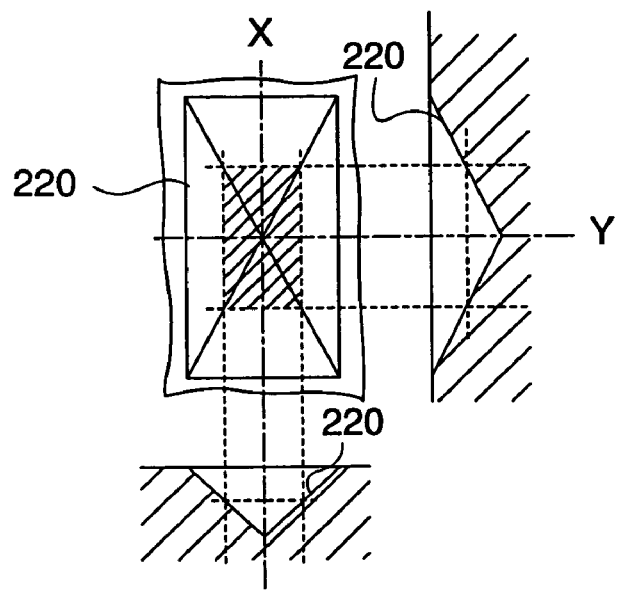
FIG. 22 is a plan view and a sectional view of a substrate with light reflection film made of a concave portion which has a substantially rectangular horizontal cross-section and which is in the shape of a pyramid in the vertical direction.

An example, in which the liquid crystal display device according to the present invention is applied to the display portion of a cellular phone, will be described. FIG. 17 is a perspective view showing the configuration of this cellular phone. As shown in the aforementioned drawing, a cellular phone 170 is provided with a plurality of operation buttons 171 and, in addition, an earpiece 172, a mouthpiece 173, and furthermore a display portion 174 using the liquid crystal display device according to the present invention (not shown in the drawing). This cellular phone 170 has the configuration in which the liquid crystal display device according to the present invention is stored in a cabinet 176 provided with a plastic protection plate 175 corresponding to a window portion 174b. In the cellular phone 170 as well, in a manner similar to that in the aforementioned personal computer, the liquid crystal display device is stored in the cabinet 176 in order that the substrate surface thereof on the observation side becomes close to the protection plate 175.

Examples of electronic apparatuses, in which the liquid crystal display device according to the present invention can be applied, include, for example, liquid crystal televisions, viewfinder type-monitor-direct-view type videotape recorders, car navigation devices, pagers, electronic notepads, desk-top calculators, word processors, work stations, videophones, POS terminals, and apparatus provided with a touch panel in addition to the personal computer shown in FIG. 16 and the cellular phone shown in FIG. 17.

As described above, by the use of the liquid crystal display device according to the present invention, even when the protection plate including fine concavities and convexities on the surface is placed in order to become close to the substrate surface of the liquid crystal display device, degradation of the display quality due to the concavities and convexities can be prevented. Consequently, reduction in thickness and miniaturization of an electronic apparatus can be achieved by placing the protection plate in order to become close to the liquid crystal display device without degradation of the display quality.

[Other Configuration]

According to the liquid crystal display device provided with the substrate with light reflection film of the present invention and the electronic apparatus including the substrate with light reflection film, even when the protection plate including fine concavities and convexities on the surface is placed closely, it is possible to prevent degradation of the display quality due to the concavities and convexities.

Such an effect is achieved by the configuration of the aforementioned liquid crystal display device or electronic apparatus, and can also be achieved by the following configurations.

(1) A liquid crystal display device, in which a liquid crystal is included between a pair of substrates facing each other, and a protection plate is placed close to the surface of the substrate on the observation side of the pair of substrates, is configured to include a scattering layer, which is placed to scatter light transmitted and which is placed on the protection plate side relative to the liquid crystal, and a reflection layer which is placed on the side opposite to the observation side relative to the aforementioned liquid crystal and in which a plurality of concavities and convexities are formed on the surface.

(2) The liquid crystal display device described in (1) is configured that the scattering layer has a haze value of 10% or more, but 60% or less.

(3) The liquid crystal display device described in (1) or (2) is configured that the reflection layer includes opening portions for passing through the light.

(4) A liquid crystal display device, in which a liquid crystal is included between a pair of substrates facing each other, and a protection plate is placed close to the surface of the substrate on the observation side of the pair of substrates, is configured to include a scattering layer, which is placed on the protection plate side relative to the liquid crystal to scatter light transmitted and which has a haze value of 10% or more, but 60% or less.

(5) The liquid crystal display device described in any one of (1) to (4) is configured that the scattering layer is placed between the polarizing plate placed on an observation-side substrate and the observation-side substrate.

(6) The liquid crystal display device described in any one of (1) to (5) is configured that the scattering layer is the one in which a plurality of fine particles are dispersed in an adhesive.

(7) An electronic apparatus is configured to include the liquid crystal display device described in any one of (1) to (6), and a protection plate close to the surface of the substrate on the observation side in the liquid crystal display device.

[Advantages]

As described above, according to the mask of the present invention and the substrate with light reflection film produced therefrom, in each of them, light transmission portions or light non-transmission portions, or a plurality of convex portions or concave portions have specified random patterns, and design or manufacture itself becomes easy, thereby making it possible to form a reflection layer having few flat portions and having smooth inclined surfaces on the base material including the plurality of convex portions or concave portions. When such a structure is used for the liquid crystal display device, etc., it becomes possible to effectively prevent occurrence of interference fringes.

According to the mask of the present invention, since a pattern with small amount of information content is used repeatedly, in a large liquid crystal display device, etc., as well as a small liquid crystal display device, etc., it becomes possible to easily and speedily design a mask capable of producing a substrate with light reflection film which brings about few interference fringes.

According to the electro-optical device and the electronic apparatus provided with the substrate with light reflection film of the present invention, occurrences of interference fringes are reduced, and design and manufacture are facilitated. According to the electro-optical device and the electronic apparatus provided with the substrate with light reflection film of the present invention, it becomes possible to effectively reduce stain patterns indefinite in shape which occur when a plurality of convex portions or concave portions in the substrate with light reflection film are made to have random patterns by combination with the light scattering film.

Furthermore, according to the electro-optical device provided with the substrate with light reflection film of the present invention and the electronic apparatus including the substrate with light reflection film, even when the protection plate including fine concavities and convexities on the surface is placed closely, it becomes possible to prevent degradation of the display quality due to the concavities and convexities.

The substrate with light reflection film of the present invention and electro-optical device, and the electronic apparatus can be applied suitably to a display device using electrophoresis, etc., besides the liquid crystal display device, etc., described in the embodiments. The entire disclosure of Japanese Patent Application Nos. 2001-186694 filed Jun. 20, 2001 and 2002-108526 filed Apr. 10, 2002 are incorporated by reference herein.

What is claimed is:

1. A manufacturing method for a liquid crystal display, the liquid crystal display including a liquid crystal element, a first substrate placed on one side of the liquid crystal element and having a light reflection film including one of convex portions and concave portions, a second substrate placed on the other side of the liquid crystal element and placed on an observation side of the liquid crystal element, and a plurality of dot regions, comprising:

coating the first substrate with a photosensitive material;

forming one of concavities and convexities on the photosensitive material by exposing the photosensitive material by use of a mask and developing the photosensitive material, the mask including light transmission portions which transmit incident light and light non-transmission portions which substantially do not transmit light, a pattern of one of the light transmission portions and the light non-transmission portions being formed in a unit including three or more dots and fewer dots than the total number of the dot regions, one of the light transmission portions and the light non-transmission portions being arranged irregularly in each of the units, the unit being arranged repeatedly;

forming the light reflection film on the one of the concavities and the convexities; and disposing a light scattering film on the observation side of the first substrate, the light scattering film having a haze value of 10% or more, but 40% or less.

2. The manufacturing method for a liquid crystal display according to claim 1, comprising disposing a protection plate on the observation side of the second substrate.

3. The manufacturing method for a liquid crystal display according to claim 1, wherein the diameters of at least one of the light transmission portions and the light non-transmission portions are specified to be values within a range of 3 to 15 μm.

4. The manufacturing method for a liquid crystal display according to claim 1, comprising at least one of the plurality of light transmission portions having different diameters and the plurality of light non-transmission portions having different diameters.

5. A manufacturing method for a liquid crystal display, the liquid crystal display including a liquid crystal element, a first substrate placed on one side of the liquid crystal element and having a light reflection film including one of convex portions and concave portions, a second substrate placed on the other side of the liquid crystal element and placed on an observation side of the liquid crystal element, and a plurality of dot regions, comprising:

coating the first substrate with a photosensitive material;

forming one of concavities and convexities on the photosensitive material by exposing the photosensitive material by use of a mask and developing the photosensitive material, the mask including light transmission portions which transmit incident light and light non-transmission portions which substantially do not transmit light, a pattern of one of the light transmission portions and the light non-transmission portions being formed in a unit including three or more dots and fewer dots than the total number of the dot regions, one of the light transmission portions and the light non-transmission portions being arranged irregularly in each of the units, the unit being arranged repeatedly;

forming the light reflection film on the one of the concavities and the convexities; and disposing a light scattering film on the observation side of the first substrate.

* * * * *